US012212618B2

(12) United States Patent
Di Girolamo et al.

(10) Patent No.: US 12,212,618 B2
(45) Date of Patent: Jan. 28, 2025

(54) OVERLAY RESOURCE TREES IN A COMMUNICATION NETWORK

(71) Applicant: CONVIDA WIRELESS, LLC, Wilmington, DE (US)

(72) Inventors: Rocco Di Girolamo, Laval (CA); Dale N. Seed, Allentown, PA (US); William Robert Flynn, IV, Schwenksville, PA (US); Catalina Mihaela Mladin, Hatboro, PA (US); Zhuo Chen, Claymont, DE (US); Quang Ly, North Wales, PA (US); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/637,898

(22) PCT Filed: Aug. 22, 2018

(86) PCT No.: PCT/US2018/047503
§ 371 (c)(1),
(2) Date: Feb. 10, 2020

(87) PCT Pub. No.: WO2019/040609
PCT Pub. Date: Feb. 28, 2019

(65) Prior Publication Data
US 2020/0220919 A1 Jul. 9, 2020

Related U.S. Application Data

(60) Provisional application No. 62/548,691, filed on Aug. 22, 2017.

(51) Int. Cl.
*H04L 67/02* (2022.01)
*G06F 16/955* (2019.01)
*H04L 67/01* (2022.01)
*H04L 67/10* (2022.01)

(52) U.S. Cl.
CPC ............ *H04L 67/02* (2013.01); *G06F 16/955* (2019.01); *H04L 67/10* (2013.01); *H04L 67/01* (2022.05)

(58) Field of Classification Search
CPC ......... H04L 67/02; H04L 67/10; H04L 67/42; G06F 16/955
See application file for complete search history.

(56) References Cited

U.S. PATENT DOCUMENTS

2001/0051946 A1* 12/2001 Nishikawa ............ G06F 16/288
2009/0241108 A1* 9/2009 Edwards ............. G06F 9/45558
718/1

(Continued)

FOREIGN PATENT DOCUMENTS

WO 2013/106188 A2 7/2013
WO 2016/032500 A1 3/2016

OTHER PUBLICATIONS

ETSI TS 118 101 V2.10.0, Technical Specification, OneM2M TS-0001 Version 2.10.0 (Release 2), "Functional Architecture", Oct. 2016, 422 pages.

(Continued)

*Primary Examiner* — Oleg Survillo
*Assistant Examiner* — Christopher P Cadorna
(74) *Attorney, Agent, or Firm* — BakerHostetler

(57) ABSTRACT

Resources on a host may be typically organized in a tree structure. In existing service layer technologies, the originators generating data may typically store their resources in default locations in such a tree, resulting in a relatively flat tree structure. As such, it may be beneficial for the service layer to provide assistance to the originators so that the originators can better structure their resources. Additionally, applications consuming the data may prefer data resources to be structured in a certain way, and may only be interested in a small subset of the hosted resources. Therefore, it may (Continued)

be beneficial for such applications to transmit to the service layer the resources that are of interest, and how to structure such resources. Embodiments described herein provide methods and systems to enable solutions to the problems discussed above, among others. Several aspects are introduced to enable such embodiments.

20 Claims, 32 Drawing Sheets

(56) References Cited

U.S. PATENT DOCUMENTS

| | | | |
|---|---|---|---|
| 2014/0351312 A1 | 11/2014 | Lu et al. | |
| 2015/0096011 A1* | 4/2015 | Watt | G06F 3/0647 |
| | | | 726/15 |
| 2015/0113149 A1* | 4/2015 | Gan | H04L 41/50 |
| | | | 709/226 |
| 2017/0064488 A1* | 3/2017 | Granzow | H04W 4/70 |
| 2017/0264565 A1* | 9/2017 | Gosselin-Harris | H04L 47/782 |
| 2017/0289002 A1* | 10/2017 | Ganguli | H04L 41/5051 |
| 2017/0310574 A1* | 10/2017 | Wolting | H04L 49/70 |
| 2017/0337088 A1* | 11/2017 | Wang | G06F 9/541 |
| 2018/0309636 A1* | 10/2018 | Strom | H04L 47/12 |
| 2019/0020449 A1* | 1/2019 | Borean | H04L 5/0032 |

OTHER PUBLICATIONS

OneM2M White Paper, "The Interoperability Enabler for the Entire M2M and IoT Ecosystem", Jan. 2015, 14 pages.

* cited by examiner

Application(s)

Service Layer (e.g. oneM2M, etc.)

Application Protocol Layer (e.g. CoAP, etc.)

Transport Layer (e.g. UDP, etc.)

Network Layer (e.g. IPv6, etc.)

MAC/PHY Layer (e.g. IEEE 802.15.4, etc.)

FIG. 2

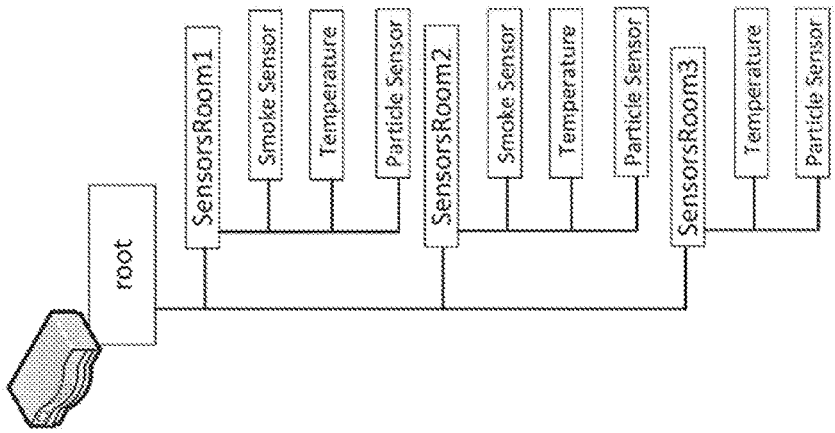
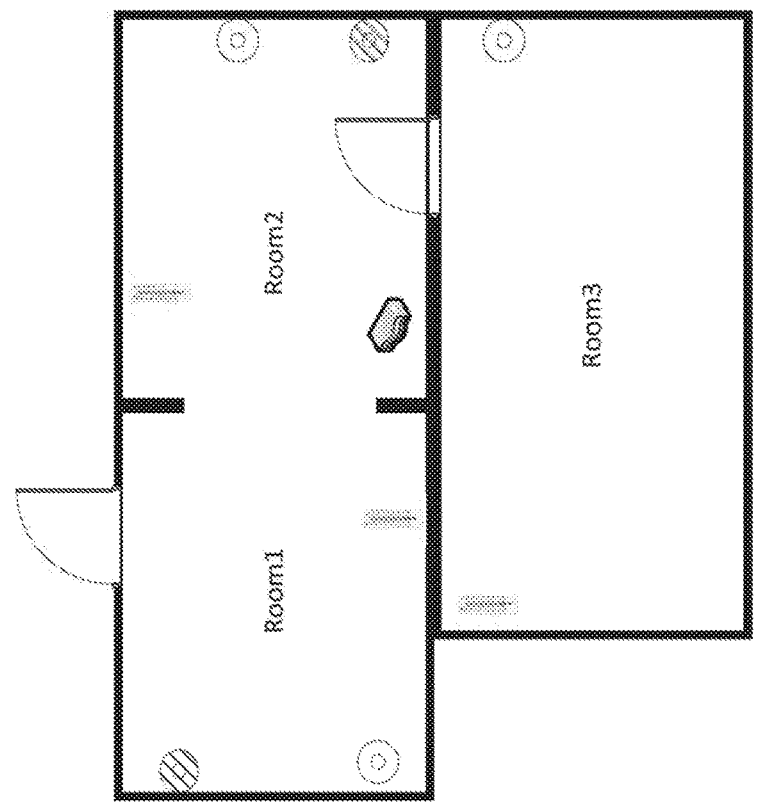
FIG. 5

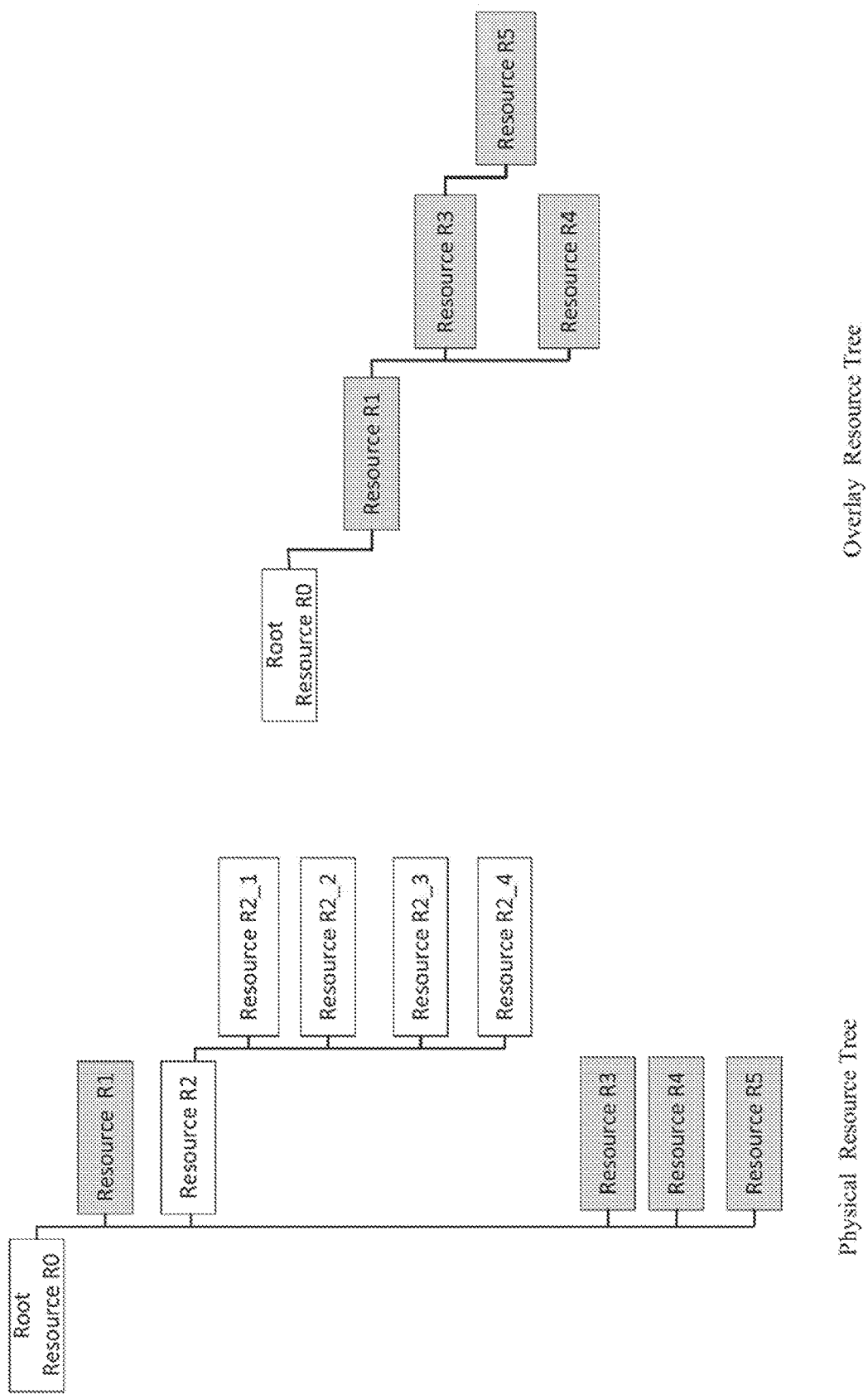
FIG. 9A — Physical Resource Tree
FIG. 9B — Overlay Resource Tree

Attribute Based

Link Based

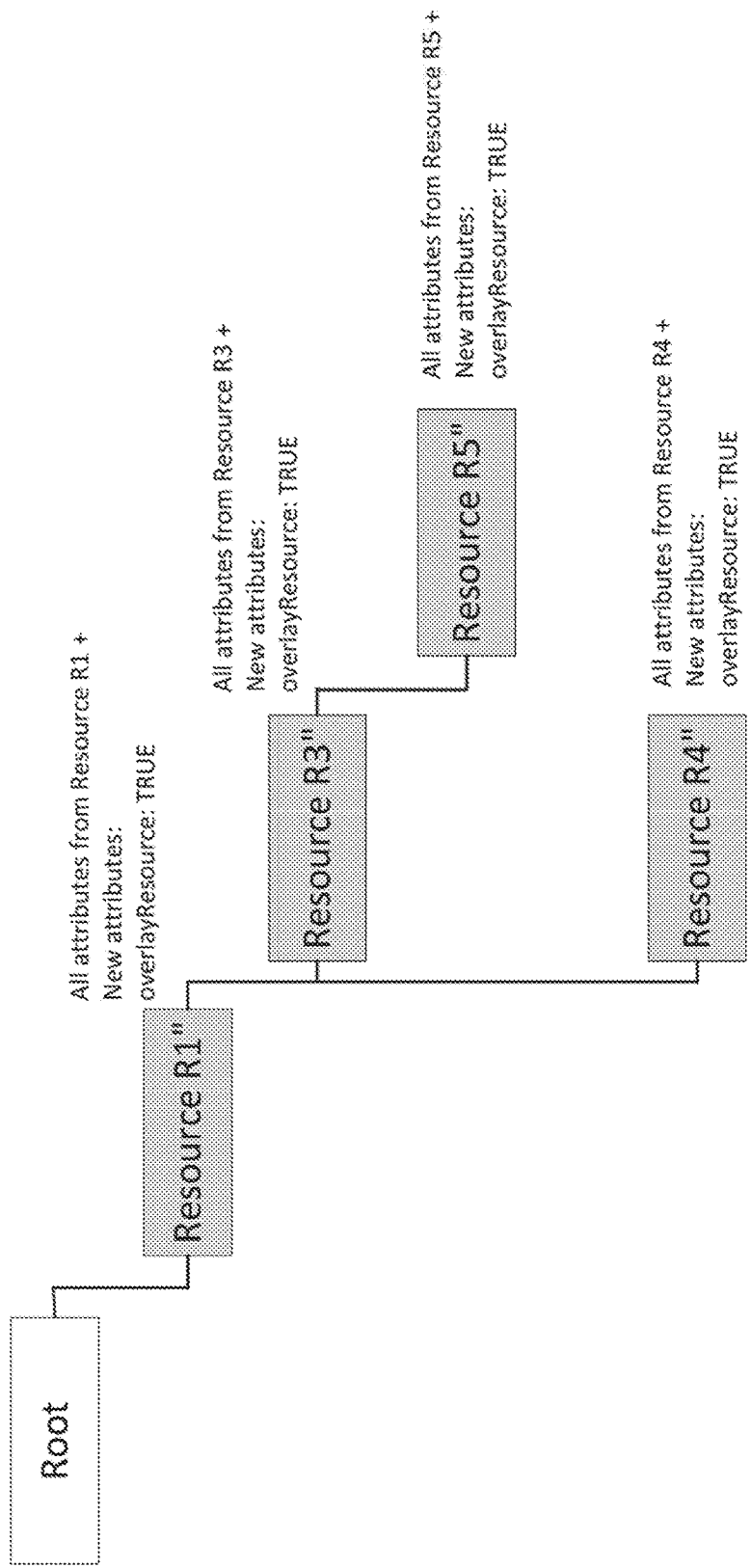
FIG. 10C Copy Based

OVERLAY RESOURCE TREES IN A COMMUNICATION NETWORK

CROSS-REFERENCE TO RELATED APPLICATIONS

This application is the National Stage Application of International Patent Application No. PCT/US2018/047503, filed Aug. 22, 2018, which claims the benefit of U.S. Provisional Patent Application No. 62/548,691, filed Aug. 22, 2017, which is hereby incorporated by reference in its entirety.

BACKGROUND

A Resource Oriented Architecture (ROA) may provide solutions for sharing data in distributed systems. Such ROAs are based on the concept of a resource, and how users may interact with this resource. A resource may be anything that can be exposed to a user, such as a sensor reading, a video clip, a business process, or any accessible item or process. Resources may be hosted on "resource-hosting" entities, hereinafter referred to as "servers," and may be manipulated and/or accessed by "resource-querying" entities, hereinafter referred to as "clients." The resources within a ROA may have the following general properties.

A resource may have a unique address within a distributed system. Such an address may typically be in the form of a Uniform Resource Identifier (URI). A URI makes the resource addressable so that it may be accessed and/or manipulated by clients. A resource may have multiple URIs (that is multiple addresses), but a URI may only refer to one unique resource. A URI may provide information about the location of the resource and how to access the resource.

A resource may have a representation, which may provide a view of the state of the resource at a given point in time. When a client retrieves a resource from a server, the resource's representation may be provided to the client. A representation may have a "link" to other resources. An application may proceed and/or progress by transitioning from one state to another. An application may retrieve a resource representation (e.g., state of resource A), which may include "links" to other resources. Progression to the next state of such an application may be influenced by these "links," similarly to how a user may navigate the web by following links of web-pages.

A resource may be manipulated by a uniform interface. A uniform interface may comprise a number of operations that may be used for many applications. Such operations may be used to allow a client to manipulate a resource on a server. For example, a client may Create/Retrieve/Update/Delete (CRUD) a resource, operations that are common to many applications.

Within a resource-hosting entity, resources may have a natural hierarchy with some resources being sub-resources of a parent resource. Logically, the resources form a resource tree. Resources within such a tree may have a parent resource and may have one or more child resources.

The potential benefits of machine-to-machine (M2M) and internet of things (IoT) communications have resulted in many sector-specific (or vertical) deployments that enable machines to communicate with each other. For example, one may find solutions for deployments in the healthcare sector, one may find solutions for deployments in the energy sector, and one may find solutions for deployments in the automotive sector. These solutions may be optimized for each vertical deployment, but fail to deliver on the promise of the all-encompassing IoT, where machines and things from different vertical applications interact with one another.

To this end, a number of standards bodies, such as, for example, oneM2M, the European Telecommunications Standards Institute (ETSI), and the Open Connectivity Foundation (OCF), are developing M2M/IoT service layers that define a single horizontal platform for the exchange and sharing of data among applications, even those from different industry sectors.

An M2M/IoT service layer may provide applications and devices access to a collection of M2M/IoT-oriented capabilities (M2M/IoT services) supported by the service layer. Such capabilities may be made available to applications via Application Programming Interfaces (APIs). For example, an M2M/IoT service layer may maintain massive amounts of M2M/IoT data, which may be discovered, retrieved, and/or subscribed-to by applications (provided those applications have suitable access rights). Additional examples of M2M/IoT services that may be provided by the service layer include security, charging, device management, provisioning, and connectivity management.

As mentioned above, oneM2M is one standard development organization that is targeting the creation of an M2M service layer. oneM2M describes its service layer as a distributed software layer akin to an operating system. This distributed software layer is implemented in a common services layer that sits between the M2M applications and the communication hardware (HW)/software (SW) that provides data transport.

The oneM2M Common Services layer provides a set of standardized M2M services which are grouped together, by functionality, into Common Services Functions (CSFs). A number of instantiated CSFs comprise a Common Services Entity (CSE).

SUMMARY

Resources on a host, such as a server, may be typically organized in a tree structure. In existing service layer technologies such as oneM2M, the originators generating data may typically store their resources in default locations in such a tree, resulting in a relatively flat tree structure. As such, it may be beneficial for the service layer to provide assistance to the originators so that the originators can better structure their resources. Additionally, applications consuming the data may prefer data resources to be structured in a certain way, and may only be interested in a small subset of the resources hosted on a server. Therefore, it may be beneficial for such applications to transmit to the service layer the resources that are of interest, and how to structure such resources.

Described herein are methods and systems to enable a service layer to provide assistance to originators so that the originators can better structure their resources. These methods and systems may also enable applications to transmit to the service layer resources that are of interest, and how to structure such resources. Several aspects are introduced.

In one aspect, a method is introduced to enable adding attributes to resources so that the resource has a new parent resource and zero or more new child resources; that is, defining a new overlay resource tree.

In another aspect, a method is introduced where a host may maintain a physical resource tree and one or more overlay resource trees.

In yet another aspect, a method is introduced by which an originator/client, for example an application or service layer, (1) may issue an overlay resource tree discovery request to a server in order to find overlay resource trees hosted on that server that match a certain criteria/description, (2) may be provided with the available/matching overlay resource tree(s), and subsequently (3) may create resources on the server according to such overlay tree(s).

In another aspect, a method is introduced by which a host may receive a request to create an overlay resource tree with a template, create the resource tree, monitor for new resources that match this template, and notify the request originator about matching resources.

In a further aspect, a method is introduced by which a host may be given a template to autonomously include resources in an overlay resource tree.

In an additional aspect, a method is introduced where a host may receive an overlay operation request tied to an overlay tree and perform the overlay operation at a branching point in the tree. Potential overlay operations may include those related to properties of descendent resources, those related to metadata stored in descendent resources, and other relevant operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 2 illustrates an example protocol stack with a service layer between an IP network stack and applications;

FIG. 5 illustrates an example small-scale IoT infrastructure;

FIG. 9A illustrates an example of a physical resource tree (PRT) hosted on a server;

FIG. 9B illustrates an example ORT associated with the PRT of FIG. 9A;

FIGS. 10A-C illustrate example ORT implementations;

DETAILED DESCRIPTION

Figure 1:
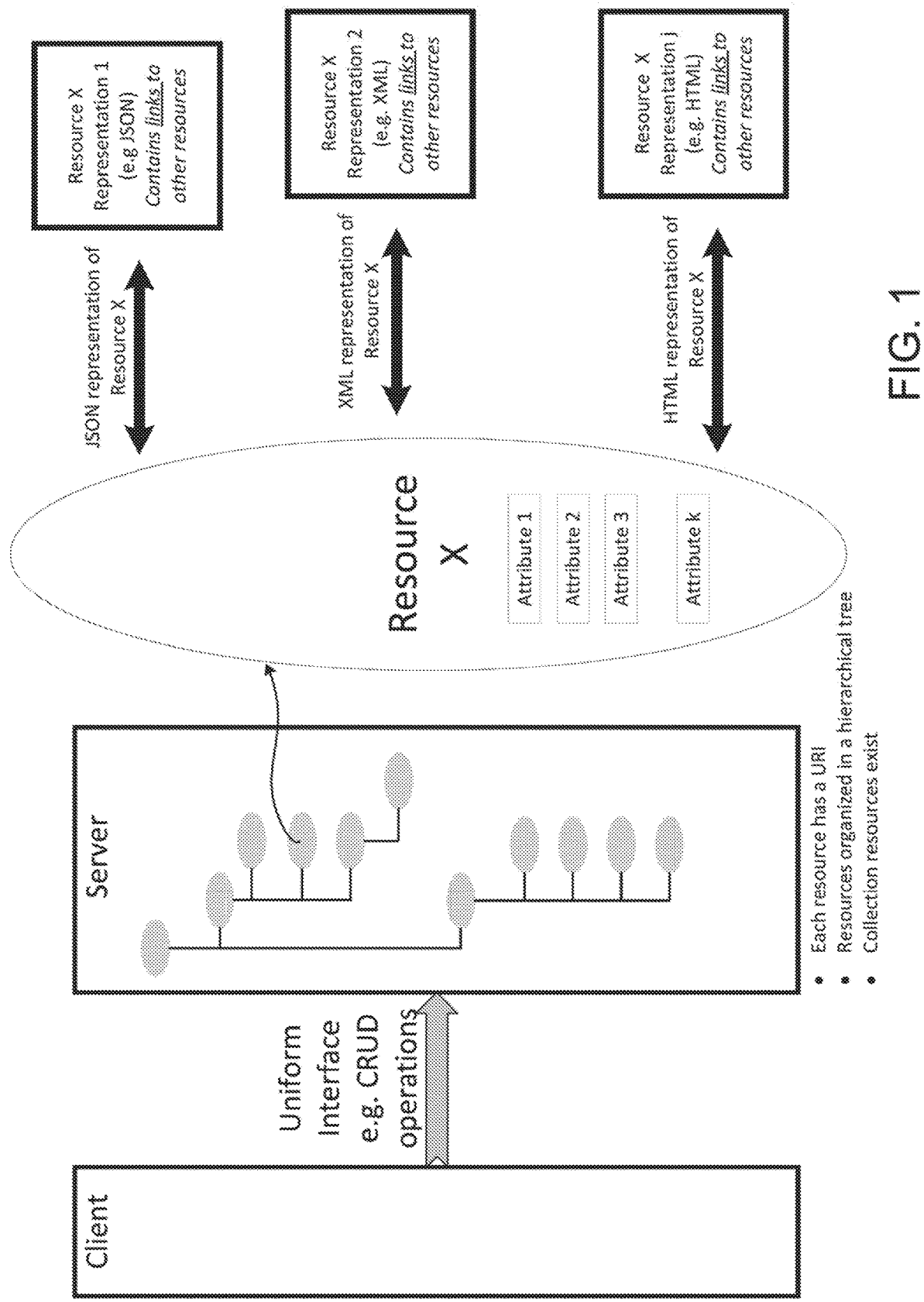
FIG. 1 illustrates a high-level overview of a Resource Oriented Architecture.

FIG. 1 illustrates a high-level overview of a Resource Oriented Architecture (ROA). ROAs may provide solutions for sharing data in distributed systems. Such ROAs are based on the concept of a resource, and how users may interact with this resource. A resource may be anything that can be exposed to a user, such as a sensor reading, a video clip, a business process, or any accessible item or process. Resources may be hosted on "resource-hosting" entities, hereinafter referred to as "servers," and may be manipulated and/or accessed by "resource-querying" entities, hereinafter referred to as "clients." The resources within a ROA may have the following general properties.

A resource may have a unique address within a distributed system. Such an address may typically be in the form of a Uniform Resource Identifier (URI). A URI makes the resource addressable so that it may be accessed and/or manipulated by clients. A resource may have multiple URIs (that is multiple addresses), but a URI may only refer to one unique resource. A URI may provide information about the location of the resource and how to access the resource.

A resource may have a representation, which may provide a view of the state of the resource at a given point in time. When a client retrieves a resource from a server, the resource's representation may be provided to the client. A representation may have a "link" to other resources. An application may proceed and/or progress by transitioning from one state to another. An application may retrieve a resource representation (e.g., state of resource A), which may include "links" to other resources. Progression to the next state of such an application may be influenced by these "links," similarly to how a user may navigate the web by following links of web-pages.

A resource may be manipulated by a uniform interface. A uniform interface may comprise a number of operations that may be used for many applications. Such operations may be used to allow a client to manipulate a resource on a server. For example, a client may Create/Retrieve/Update/Delete (CRUD) a resource, operations that are common to many applications. Hypertext Transfer Protocol (HTTP) defines additional operations to manipulate resources, but these operations are not as common (e.g., PATCH, TRACE, HEAD, OPTIONS, CONNECT).

State information tied to a resource may comprise the resource's metadata. Often the metadata may be defined as resource attributes. Such attributes may define properties of the resource. An attribute list that defines properties of a resource may include the following attributes: type, creation time, last modified time, expiration time, access rights, size, number of child resources, parent resource, label/marker, and creator.

In addition, a resource's attributes may also define state information related to the intended use of the resource. For example, if the resource is used for storing a temperature sensor reading, one attribute may be the latest reading generated by the temperature sensor.

Within a resource-hosting entity, resources may have a natural hierarchy with some resources being sub-resources of a parent resource. Logically, the resources form a resource tree. Resources within such a tree may have a parent resource and may have one or more child resources.

Additionally, some resources may be a collection of one or more related resources. As described herein, each related resource in a Collection resource is referred to as a "resource element" or just an "element." The element of a collection resource may be a child-resource or a link reference (e.g., URI) pointing to another resource.

The potential benefits of machine-to-machine (M2M) and internet of things (IoT) communications have resulted in many sector-specific (or vertical) deployments that enable machines to communicate with each other. For example, one may find solutions for deployments in the healthcare sector, one may find solutions for deployments in the energy sector, and one may find solutions for deployments in the automotive sector. These solutions may be optimized for each vertical deployment, but fail to deliver on the promise of the all-encompassing IoT, where machines and things from different vertical applications interact with one another.

To this end, a number of standards bodies (for example, oneM2M) are developing service layers that define a single horizontal platform for the exchange and sharing of data among applications, even those from different industry sectors.

From a protocol stack perspective, service layers may be typically situated above an application protocol layer and may provide value-added services to applications. Hence, service layers are often categorized as "middleware" services. FIG. 2 illustrates an example protocol stack with a service layer between an IP network stack and applications.

An M2M/IoT service layer may provide applications and devices access to a collection of M2M/IoT-oriented capabilities (M2M/IoT services) supported by the service layer. Such capabilities may be made available to applications via Application Programming Interfaces (APIs). For example, an M2M/IoT service layer may maintain massive amounts of M2M/IoT data, which may be discovered, retrieved, and/or subscribed-to by applications (provided those applications have suitable access rights). Additional examples of M2M/IoT services that may be provided by the service layer include security, charging, device management, provisioning, and connectivity management.

Figure 3:
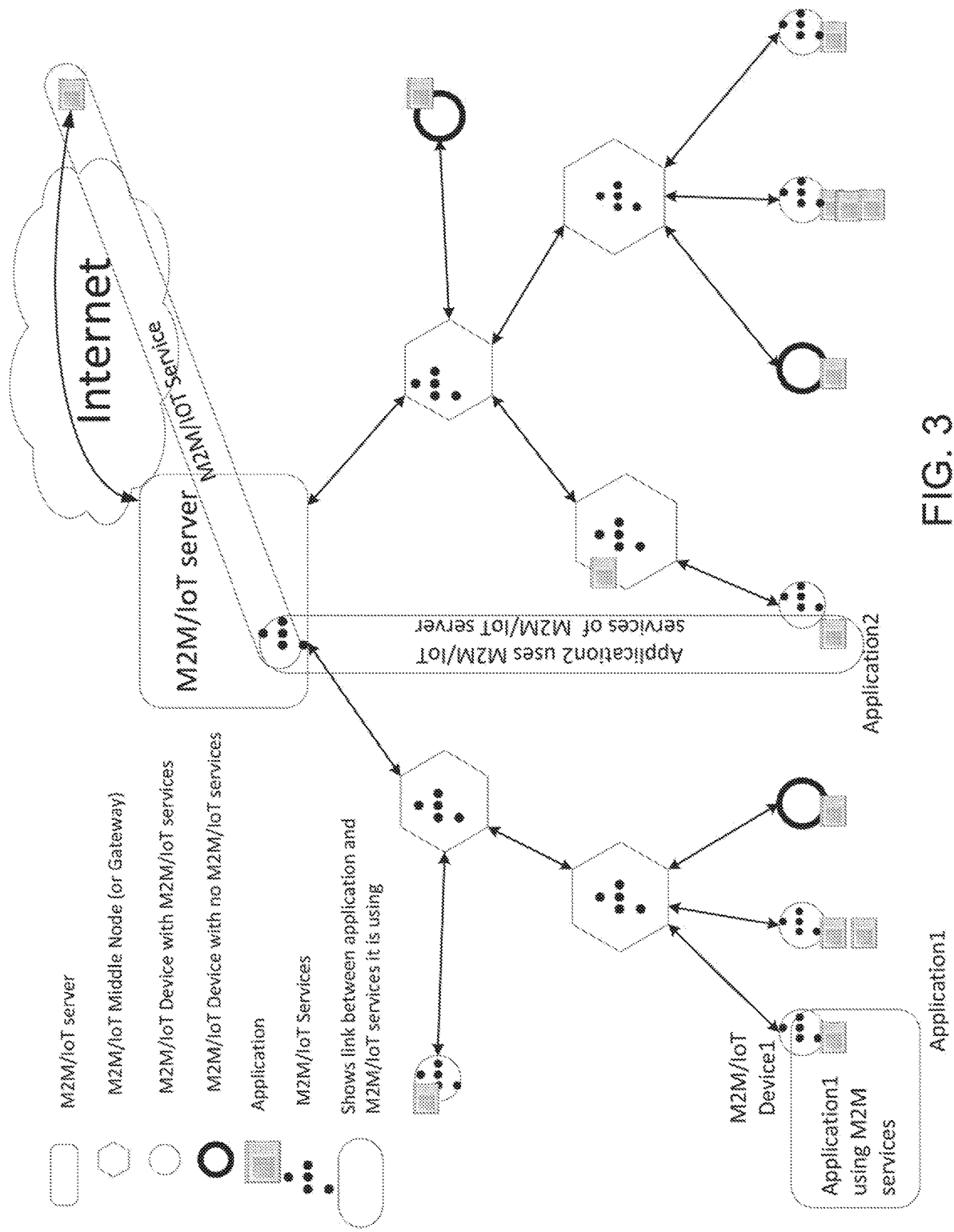
FIG. 3 shows an example M2M/IoT deployment.

An M2M/IoT deployment, such as the example M2M/IoT deployment illustrated in FIG. 3, may comprise various entities/nodes that provide various levels of M2M/IoT service functionality. For example, and as shown in FIG. 3, an M2M/IoT deployment may comprise the following devices: M2M/IoT servers, which may host M2M/IoT services and may be operated by an M2M/IoT service provider; M2M/IoT middle nodes (or gateways), which may host M2M/IoT services; M2M/IoT devices, which may host M2M/IoT services; and "light" M2M/IoT devices, which may typically not host M2M/IoT services.

Applications may reside on these entities or have access to these entities through a network and may take advantage of the provided M2M/IoT services. As shown in FIG. 3, M2M/IoT services may be provided locally. For example, application1 may use local M2M/IoT services provided by M2M/IoT Device1 to provide data storage. In addition, M2M services may also be provided remotely. For example, application2 may use the services provided by the M2M/IoT server to make the data of application2 discoverable. The M2M/IoT services deployment shown in FIG. 3 is inherently hierarchical and distributed, and such a hierarchy may be typical of M2M/IoT service layers described in oneM2M and ETSI M2M.

A number of standardization efforts are ongoing to define M2M/IoT service layers, such as oneM2M, the European Telecommunications Standards Institute (ETSI), and the Open Connectivity Foundation (OCF). Each service layer definition offers a set of M2M/IoT services. Some of these services are unique, differentiating between the service layer definitions. However, many of these services are common, such as, for example, data storage, resource discovery, and sending notifications. Additionally, these service layer definitions follow the principles of ROA. Because of this commonality, a defined service layer may be selected to describe the typical services and operation of a service layer. In particular, the oneM2M service layer is described below.

oneM2M is one standard development organization (SDO) that is targeting the creation of an M2M service layer. oneM2M describes its service layer as a distributed software layer akin to an operating system. This distributed software layer is implemented in a common services layer that sits between the M2M applications and the communication hardware (HW)/software (SW) that provides data transport.

Figure 4:
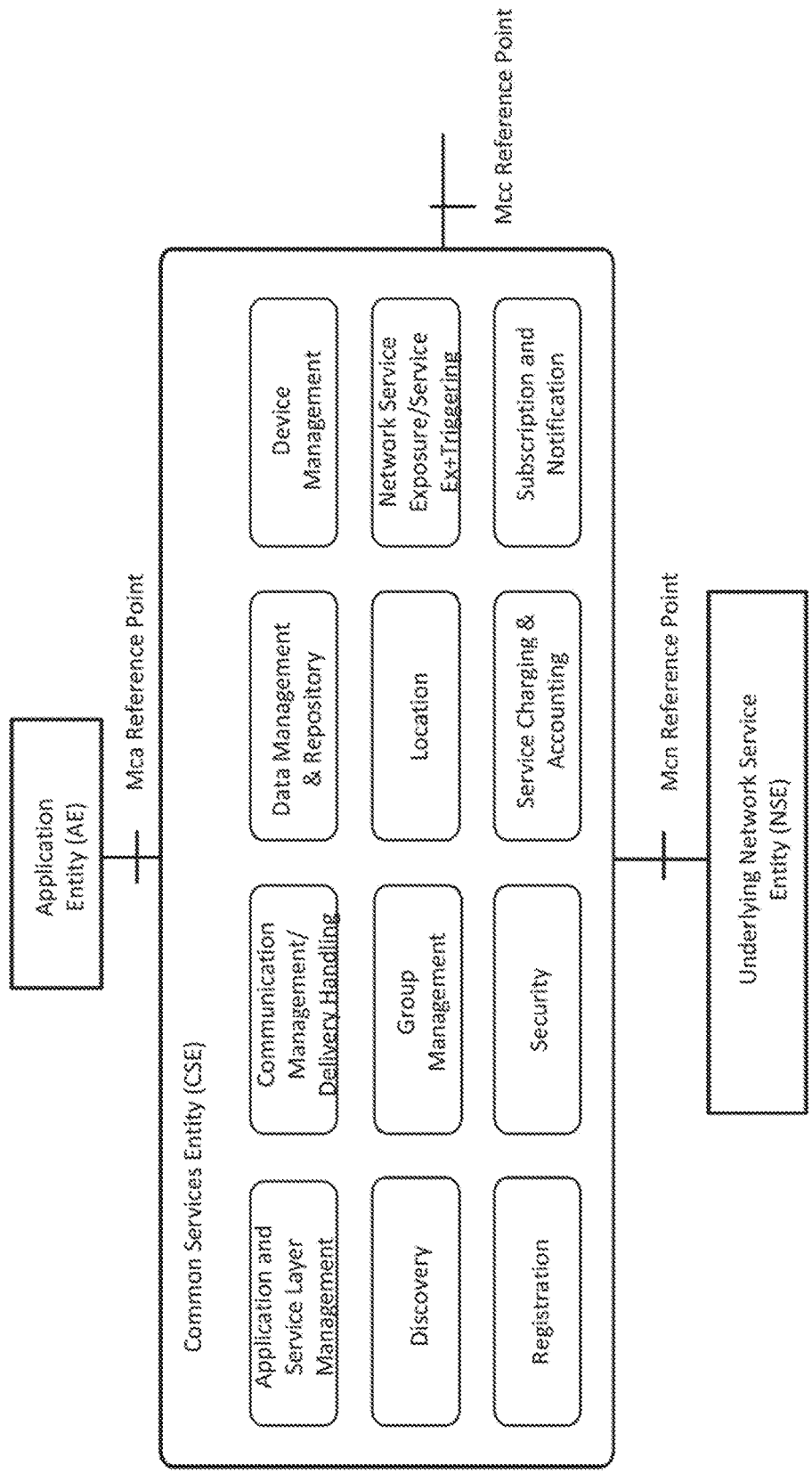
FIG. 4 illustrates twelve CSFs that are currently defined by oneM2M.

The Common Services layer provides a set of standardized M2M services which are grouped together, by functionality, into Common Services Functions (CSFs). A number of instantiated CSFs comprise a Common Services Entity (CSE). As illustrated in FIG. 4, these service layers (CSEs) interface with the following: applications (Application Entities or AEs in oneM2M nomenclature) through an Mca reference point; other service layers (CSEs), through an Mcc (or Mcc') reference point; and the underlying networks (Network Service Entity or NSE in oneM2M nomenclature) through an Mcn reference point.

FIG. 4 illustrates twelve CSFs that are currently defined by oneM2M. Each CSF is briefly described as follows.

An Application and Service Layer Management CSF provides management of AEs and CSEs, including capabilities to configure, troubleshoot, and upgrade functions of the CSE, as well as to upgrade the AEs.

A Discovery CSF searches for information about applications and services based on a filter criteria.

A Registration CSF provides the functionality for AEs (or other remote CSEs) to register with a CSE. This allows the AEs (or the remote CSE) to use the services of the CSE.

A Communication Management/Delivery Handling CSF provides communications with other CSEs, AEs, and NSEs. This CSF decides at what time and on which communication connection(s) to deliver communications and, if necessary and allowed, to buffer communications request so that such requests can be forwarded at a later time.

A Group Management CSF provides for the handling of group-related requests and enables an M2M system to support bulk operations on multiple devices, applications, etc.

A Security CSF provides security functions for the service layer, such as access control including identification, authentication, and authorization.

A Data Management and Repository CSF provides data storage and mediation functions, such as collecting data for aggregation, re-formatting data, and storing data for analytics and semantic processing.

A Location CSF provides the functionality to enable AEs to obtain geographical location information.

A Service Charging & Accounting CSF provides charging functions for the service layer.

A Device Management CSF provides management of device capabilities on M2M gateways and M2M devices.

A Network Service Exposure, Service Execution and Triggering CSF manages communications with Underlying Network(s) for accessing network service functions.

A Subscription and Notification CSF provides functionality to allow for subscribing to an event and being notified when the event occurs.

oneM2M defines activity through its CSE resource tree. The root of the tree is resource <CSEBase>, and child resources stem from this singular branching point. oneM2M defines many resource types that may be hosted in this tree. Such resources may be related to some "physical item" that is represented in the oneM2M system or may be related to a service offered by the oneM2M system. Table 1 displays examples of oneM2M resources related to "physical items" represented in oneM2M, and Table 2 displays examples of oneM2M resources related to services offered by oneM2M.

TABLE 1 oneM2M Resources related to "Physical Items" represented in oneM2M

| Description | Resource Type |
|---|---|
| Nodes/entities hosting CSEs and/or applications that interact with the oneM2M system | node |
| Access control policies to define "who" is allowed to interact with resources (also includes things like "how" and "when" to interact with a resource) | ACP |
| Applications that have registered to the oneM2M system and can use its services | AE |
| Remote CSEs that have registered to another CSE, to use the service offered by that other CSE | remoteCSE |
| Collection resource that hosts data in child resources | container flexContainer timeSeries |
| Child resources that store opaque data in the oneM2M system. This data is typically from applications, but may also be from other CSEs. | contentInstance timeSeriesInstance |

TABLE 2 oneM2M Resources related to Services offered by oneM2M

| Description | Resource Type |
|---|---|
| Provides a service that allows a resource to be subscribed-to, and for the CSE hosting this resource to send out notifications when some event happens | subscription |
| Provides a service that allows a CSE to fan-out a CRUD operation to multiple recipients | group |
| Provides a mechanism to poll a request-unreachable entity. For instance, for AEs or CSEs which are behind Network Address Translators (NAT) and that cannot receive a request from other nodes | pollingChannel |
| Provides a service for store-and-forward of requests | delivery |

The oneM2M <group> resource provides a service to fan out a CRUD request to a number of recipients. A list of recipients may be included in the memberIDs attribute of the <group> resource. If entity 1 wants to fan out a request to the all the recipients in the list, it may send out a single request to the <fanOutPoint> associated with the <group> resource. The CSE hosting the <group> resource may then issue individual requests to each of the members of the memberIDs list. The CSE may also aggregate the responses for each of these requests, and return a single aggregated response to entity 1.

Some services that a child resource receives are a direct result of the child resource's relationship to its parent resource. These services may be provided to direct child resources and to further descendants of a parent resource. Examples of these services are provided below.

In an example, child resources may have access controls that are tied to their parent resource. This allows descendants of a parent resource to share the same access control policy as that parent resource. A CSE may provide a service to verify access control by verifying access control of the parent resource.

In another example, a CSE may provide a service that allows an entity to retrieve all descendants of a single parent resource.

In yet another example, for <container> resources, a CSE may provide a service to monitor <contentInstance> child resources to ensure that limits with respect to the following are respected: maximum number of instances, maximum size, and maximum age of direct child resources.

Resources on a host, such as, for example, a server or CSE, may be typically organized in a tree structure. In existing service layer technologies such as oneM2M, the originators generating data may typically store their resources in default locations in such a tree, resulting in a relatively flat tree structure. As such, it may be beneficial for the service layer to provide assistance to the originators so that the originators can better structure their resources. Additionally, applications consuming the data may prefer data resources to be structured in a certain way, and may only be interested in a small subset of the resources hosted on a server or CSE. Therefore, it may be beneficial for such applications to transmit to the service layer the resources that are of interest, and how to structure such resources.

Figure 6:
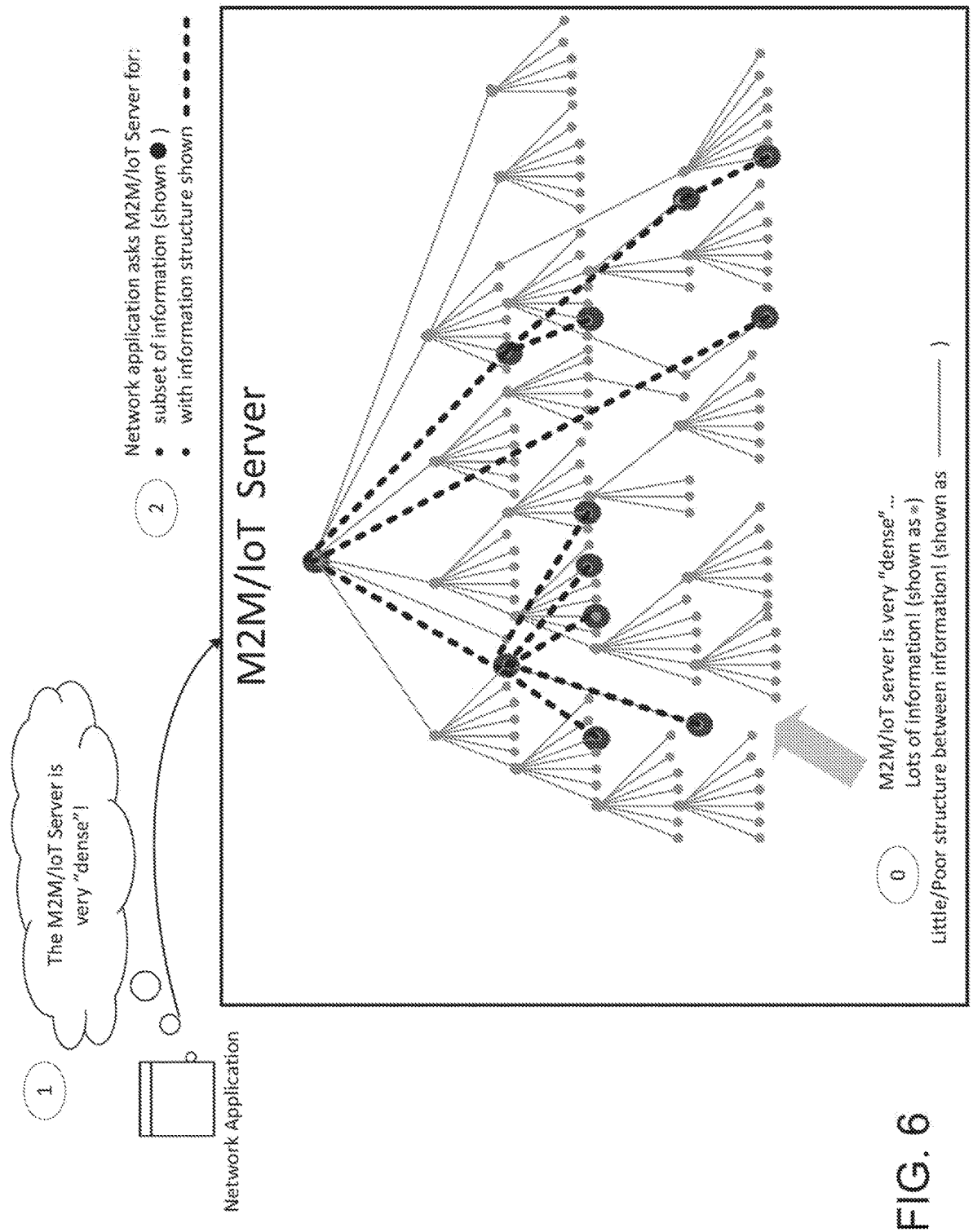
FIG. 6 illustrates an example M2M/IoT server with a dense resource tree.

To illustrate the deficiencies of existing systems, consider the following use cases, shown in FIGS. 5 and 6.

IoT devices may be used in small-scale infrastructures, such as throughout a home. Such IoT devices may be purchased directly by end consumers and installed with little-to-no manual configuration. For example, assume a user would like to make his three-room apartment into a smart home. The user may purchase a home router that has a "smart home" application and service layer, three smoke detectors, three thermometers/thermostats, and two particle count sensors. The user may locate the home router centrally to guarantee connectivity in all rooms. The user may then take the devices out of their boxes, install them in the respective rooms, as shown in FIG. 5, and turn them on. The user may wish to take advantage of the service layer features of the Home Gateway, but the smart home application on the Home Gateway may expect the sensor data resources created by the IoT devices to be structured per room. When the user purchased the devices, he was told that installation was plug-n-play. As a result, the user may expect to have the sensor data arranged in a room-based resource tree, as shown on the right of FIG. 5, to take advantage of the Home Gateway application without having to manually configure these settings.

IoT devices may be used by large-scale infrastructures, such as a traffic management system deployed in a major city. Such a system may make use of an M2M/IoT server that stores all (or almost all) collected traffic data, and may provide an API so that network applications may access this data. Data collected may include information about available street parking, traffic flow on highways, wait times of vehicles at major intersections, and other useful traffic information. This information may be collected by multiple nearby boroughs/towns, each with their own formats of storing data, data collection rates, etc. Some network applications may make use of the information to direct/route emergency vehicles, thereby avoiding traffic. In order to make quick and reliable decisions, these network applications need to access the information they need very quickly. This may be demanding on the M2M/IoT server as: the amount of information stored in the M2M/IoT server may be extremely large; the format of the information may be different; and the information is coming from different sources and often is not stored in the M2M server in a structured manner.

The network application may be interested only in a small subset of the collected information. In an effort to improve the efficiency in accessing the information, the network application may ask the M2M/IoT server to isolate the information the M2M/IoT server needs, and to structure the information in a certain format. FIG. 6 shows such an example M2M/IoT server with a dense resource tree. The resource tree has many resources, shown as grey dots, and parent/child relationships interconnecting these resources, shown as grey solid lines between the resources. The network application may be interested only in the 12 (black circle) resources, with parent-child relationships shown by dashed black lines.

In the small-scale use case, the IoT devices may have no a priori knowledge on how to structure the resources that they are creating in the service layer. A large number of IoT devices may be installed with little to no manual configuration. Such devices should be able to connect to the service layer and begin storing their resources. For example, in oneM2M, AEs may likely store their data container resources either as child resources of their <AE> resource or as child resources of the service layer root (<CSEBase>) resource. Such a storage method may lead to relatively flat resource trees that may not be capable of using some service layer features, such as for example applying access control policy enforcement to a parent and all of its child resources, or retrieval of a parent resource and all of its child resources. A service layer may be in a good position to determine how best to structure the data. However, in existing systems there is not a way for a service layer to assist an application.

In the large-scale use case, the resource trees may be so large and dense that navigating through these trees to respond to originator requests may be very time consuming and may also consume a large amount of processing power. A service layer may be an ideal candidate to extract relevant resources and create an overlay structure on top of the physical resource tree, but existing systems do not allow applications to request such actions from the service layer.

Some of these service layer actions may be addressed using the group functionality that is inherent in many service layers. However, 'grouping' resources and 'overlaying' resources are different from an operational perspective. Grouping may allow an originator to pick and choose resources from a resource tree and then perform an operation on these resources, e.g., create a new child resource under all of the grouped resources, update all of the grouped resources, retrieve all of the grouped resources, and/or delete all of the grouped resources. Generally, grouping facilitates interaction with a subset of resources. Overlaying may allow an originator to pick and choose resources from a resource tree and then reorganize these resources with new parent-child relationships, forming a new overlay resource tree. Such a process may allow services to be run on resources within this new resource tree, based on the newly formed parent-child relationships.

Described herein are methods and systems to enable a service layer to provide assistance to originators so that the originators can better structure their resources. These methods and systems may also enable applications to transmit to the service layer resources that are of interest, and how to structure such resources. Several aspects are introduced.

In one aspect, a method is introduced to enable adding attributes to resources so that the resource has a new parent resource and zero or more new child resources; that is, defining a new overlay resource tree.

In another aspect, a method is introduced where a host may maintain a physical resource tree and one or more overlay resource trees.

In yet another aspect, a method is introduced by which an originator/client, for example an application or service layer, (1) may issue an overlay resource tree discovery request to a server in order to find overlay resource trees hosted on that server that match a certain criteria/description, (2) may be provided with the available/matching overlay resource tree(s), and subsequently (3) may create resources on the server according to such overlay tree(s).

In another aspect, a method is introduced by which a host may receive a request to create an overlay resource tree with a template, create the resource tree, monitor for new resources that match this template, and notify the request originator about matching resources.

In a further aspect, a method is introduced by which a host may be given a template to autonomously include resources in an overlay resource tree.

In an additional aspect, a method is introduced where a host may receive an overlay operation request tied to an overlay tree and perform the overlay operation at a branching point in the tree. Potential overlay operations may include those related to properties of descendent resources, those related to metadata stored in descendent resources, and other relevant operations.

Additionally, embodiments of the described procedures are described with reference to a oneM2M system and an example Graphical User Interface (GUI) to configure and monitor some of the proposed features.

Overlay Resource Trees

An Overlay Resource Tree (ORT) may act as an "overlay" to a Physical Resource Tree (PRT). A PRT may be a tree created by child-parent relationships between resources hosted on a server. A PRT may have a root and branches stemming from multiple branching points. An ORT may be formed by selecting a subset of resources in a PRT and establishing parent-child relationships between those selected resources. An ORT may comprise a root resource and a number of descendent child resources. A server with a PRT may host zero or more ORTs.

Figure 7:
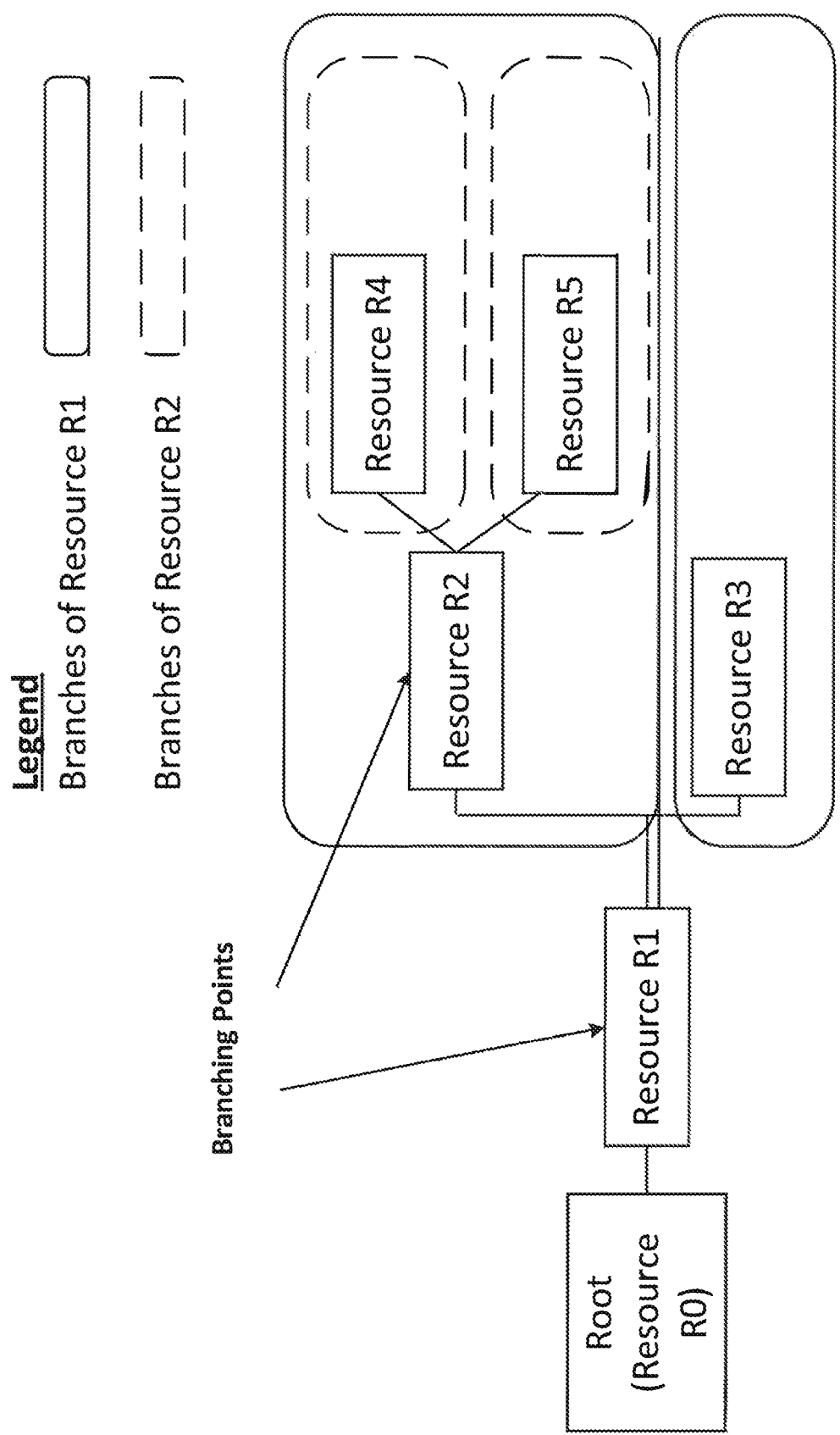
FIG. 7 illustrates the "parts" of an overlay resource tree (ORT)

FIG. 7 illustrates the "parts" of an ORT. As shown, a "branching point" may be a resource in a tree (ORT or PRT) that has one or more child resources, and a "branch" may be a part of a resource tree stemming from a branching point. A branching point may have one or more associated branches.

The following terms are used herein as follows:

An "ORT Consumer" may be an entity that uses the ORT in the ORT Host, such as, for example, an application or service layer. An ORT Consumer may have several potential uses for ORTs. In an example embodiment, an ORT Consumer may rely on the ORT Host to manage a resource tree. The ORT Host may have a PRT and zero or more ORTs. For example, the ORT Consumer may determine that desired resources are part of ORT1, and then the ORT Consumer may issue CRUD requests targeting this specific overlay, ORT1. In another example embodiment, an ORT Consumer may rely on the ORT Host to provide overlays that provide guidance on how to physically structure resources in the PRT. In such an embodiment, no overlay resource tree may be created in the ORT Host. Instead, the ORT Consumer may ensure that physical resources the ORT Consumer creates in the physical resource tree follow resource tree guidance provided by the ORT Host.

An "ORT Host" may be an entity that hosts the Physical Resource Tree (PRT) and one or more ORTs. Such an entity may notify an ORT Producer about potential resources that may be included in an ORT. The ORT Host may execute services based on defined ORTs and may respond to requests from ORT Consumers. In non-limiting example, an ORT Host may be an entity such as a service layer.

An "ORT Producer" may be an entity that desires to have resources restructured according to a certain ORT. As resources are created on an ORT Host, the ORT Host may ask the ORT Producer if each new resource should be included in the ORT. In non-limiting example, an ORT Producer may be an entity such as an application or service layer.

An "ORT Repository" may be an entity that stores overlay resource trees that may be useful in an M2M/IoT service provider domain.

An "ORT Template" may define a template that allows an ORT Host to determine, based on a mask, if a resource in a PRT should be included in an ORT, and if so, what action, if any, the ORT Host should perform for the resource.

Figure 8:
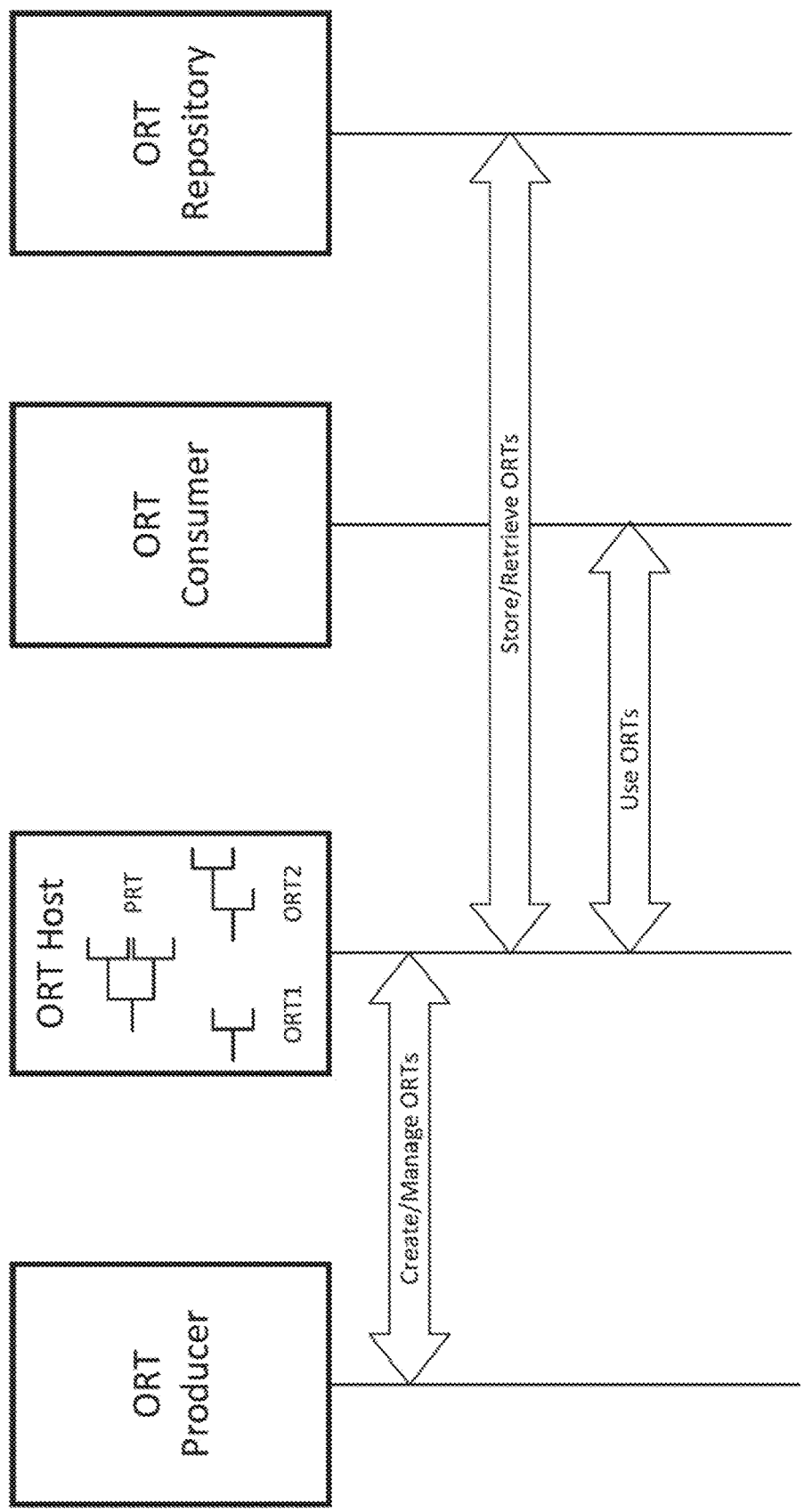
FIG. 8 illustrates example functional entities that may interact with an ORT.

FIG. 8 illustrates example functional entities that may interact with an ORT. Particularly, FIG. 8 illustrates an ORT Producer, an ORT Host, an ORT Consumer, and an ORT Repository. Each of these entities may be logical and may reside in different physical nodes or may be collocated in one or more physical nodes. For example, a physical node may be both an ORT Producer and an ORT Consumer.

To ease representation, descriptions used herein may follow oneM2M conventions and use '<' and '>' delimiters to denote resources of a certain type. For example, a <TypeABC> resource may be an abbreviation denoting a resource of type: TypeABC. A specific <TypeABC> resource may be denoted by an identifier, such as, for example: T1. Such an identifier may be a URI of the resource.

ORTs may be defined as resources in an ORT Host and ORT Repository. Such a definition may allow ORT Producers and ORT Consumers to interact with the overlays defined in an ORT Host. Two new resource types are introduced: overlay and dynamicOverlayTemplate. At a high level, the <overlay> resource may comprise information about an ORT, including, for example, the ORT's structure (i.e., resources included in this tree and the parent-child relationships between these resources), its description, and its schedule. The <overlay> resource may store such information in a staticOverlayTemplate attribute. An ORT may also have one or more associated and/or linked <dynamicOverlayTemplate> resources. Each of these resources may define a dynamic template to allow an ORT Host (1) to determine which resources should be included in this ORT and (2) to determine what action to perform when the ORT Host finds a resource to be included in the ORT. The resource tree structure of an overlay may be specified directly through the staticOverlayTemplate attribute, or indirectly through <dynamicOverlayTemplate> resources associated with the overlay. Additional details about these new resource types are provided below.

An <overlay> resource may be created by an ORT Producer and may contain the following attributes:

overlayName: This may be a descriptive name given to the overlay.

overlayID: This may be an identifier assigned to the overlay definition.

overlayProducer: This may be an identity of the ORT Producer—the entity that created this overlay.

staticOverlayTemplate: This may denote the structure of the resource tree for the ORT. The structure may be a representation of the resource tree and may include the root and all branching points stemming from this root. For example, this attribute may be in the form of a list that defines the root resource of the ORT, each of the branching points of the ORT, and the direct child resources of each branching point. For example, for the ORT shown in FIG. 7, the staticOverlayTemplate may be as defined as follows:

---

Root: Resource R0
Branching Points: (format: "Branching Point: {list of direct child resources}")
    Root: Resource R1
    Resource R1: {Resource R2, Resource R3}
    Resource R2: {Resource R4, resource R5}
    Resource R3: null
    Resource R4: null
    Resource R5: null

---

Alternatively, the staticOverlayTemplate attribute may be represented in other formats, such as for example, a JSON format, which may include all attributes and child resources of each resource. For example, for the ORT shown in FIG. 7, the staticOverlayTemplate may be represented as shown below. Note that for clarity, the "ResourceID" is shown using the names, R0, R1, R2, R3, R4 and R5.

---

```
{
    "root" :{
        "ResourceID": "R0",
        "children" : [{
            "ResourceID": "R1",
            "children" : [
            {
                "ResourceID": "R2",
```

-continued

```
            "children" : [
            {
                "ResourceID":"R4",
                "children" : null
            },
            {
                "ResourceID": "R5",
                "children" : null
            }]
        },
        {
            "ResourceID": "R3",
            "children" : null
        }]
    }]
}
``` overlaySchedule: This may be a schedule defining when the overlay should be active and/or enabled. An overlay may be active as soon as it is created and may remain active until it is deleted. Alternatively, the overlay may be active for specific periods of time. For example, an overlay may be active from 2 AM to 3 AM.

overlayDescription: This may be a description of an overlay that may be used to assist in discovery. The description may provide an indication of how the overlay may be used. For example, the overlayDescription may indicate that the overlay generates an ORT where resources are collected per manufacturer. So, resources created by devices of manufacturer MFCTR1 may be child resources under a single parent resource.

overlayDiscoverable: This may be a Boolean denoting if the overlay may be discovered by ORT Consumers and ORT Producers.

overlayAdvertise: This may be a Boolean denoting if the overlay may be advertised in an ORT Repository.

overlayAccessControl: This may comprise information on access control to discover, retrieve, delete, or update this resource. This access control may comprise information related to 'who' is allowed to access the <overlay> resource, 'what' actions are allowed on the <overlay> resource, when this action is allowed, and other relevant information.

dynamicOverlayTemplateIDs: This may refer to zero or more <dynamicOverlayTemplate> resources. In some embodiments, instead of having a list of dynamicOverlayTemplateIDs that link to <dynamicOverlayTemplate> resources, <dynamicOverlayTemplate> resources may be direct child resources, of the <overlay> resource. The <dynamicOverlayTemplate> resource is described in more detail below.

Each ORT may optionally have one or more associated <dynamicOverlayTemplate> resources. A <dynamicOverlayTemplate> resource may be created by an ORT Producer. Each of these resources may define a 'mask' that an ORT Host may use to determine if a resource in the PRT should be included in the ORT. If a resource in the PRT matches the 'mask', then the <dynamicOverlayTemplate> resource may determine an appropriate action for the ORT Host to take. An ORT may be defined without an associated <dynamicOverlayTemplate> resource. In such a case, the overlay may be defined by the staticOverlayTemplate attribute of the <overlay> resource, as described above.

A <dynamicOverlayTemplate> resource may comprise the following attributes: 'dynamicOverlayTemplateProducer'; 'dynamicOverlayTemplateID'; 'mask'; 'action'; 'action detail'; and 'periodicity'. An ORT Host may use such a <dynamicOverlayTemplate> resource to find and/or to select resources in the PRT that match the 'mask' and to perform a defined 'action'. For example, an ORT may have a template that specifies a 'mask' that selects <T1> resources (i.e., resources of Type T1) that are children of Resource R6, and, as 'action', may include these as children of Resource R2 in the ORT. The attributes of a <dynamicOverlayTemplate> may be defined as follows:

dynamicOverlayTemplateProducer: This may be an identity of the dynamic overlay template producer.

dynamicOverlayTemplateID: This may be an identifier associated with the dynamic overlay template resource.

mask: May denote a filter criteria used by the ORT Host to find resources to be included in the ORT. The 'mask' may include one or more of the following criteria:

access rights associated with the resource: For example, resources with access rights that allow Node N1 to update Resource R6 resource creator: For example, resources that are created by Node N2 resource type: For example, resources of type "dataSensorReading"

semantic filter: For example, resources that match a given semantic filter (e.g., SPARQL)

parent resource: For example, resources that are child resources of Resource R6 a label and/or marker associated with a resource: for example, resources that have a label "Manufacturer1"

resource size: For example, resources larger than a certain size or having a minimum number of child resources; this criterion may be useful for collection resources.

creation time of resource: For example, resources that were created between time t1 and t2 lifetime of resource (how long before the resource expires): For example, resources that are valid for at least another 60 minutes last modified time of a resource: For example, resources that have been modified in the last 30 minutes The ORT Host may treat criteria not included in the 'mask' attribute as wildcards so that they may not impact a matching decision by the ORT Host.

action: If an ORT Host finds a resource that matches the 'mask', it may perform one or more actions. For example, an 'action' may be "send notification". An ORT Host may send a notification. Such a notification may typically be sent to an ORT Producer to inform the ORT Producer, and optionally one or more ORT Consumers, that a resource matching the 'mask' has been created and/or updated in the ORT Host. The ORT Producer may decide to include this in the ORT. In another example, an 'action' may be "update overlay". An ORT Host may update an overlay. An associated template may allow an ORT Host to autonomously include a resource matching the 'mask' in an ORT and may further specify where in the hierarchy of the ORT the resource is to be located.

action detail: May provide additional detail when 'action' is set to actions that may require additional information. For example, if the 'action' attribute is set to "update overlay", the 'action detail' attribute may provide a URI of a resource that is to become the new parent of the matching resources.

periodicity: May inform an ORT Host how often to iterate over the PRT to find resources matching the 'mask' and to take the set 'action'. Example settings for this attribute may include the following: Always; One time; and Periodically. If set to "Always", the ORT Host may continuously monitor the PRT looking for matching resources. A possible trigger for the monitoring may comprise a resource creation and/or update to the PRT. If set to "One time", the ORT Host may check for matching resources at a specified time. If set to "Periodically", the ORT Host may check for matching resources at each configured interval. For example, if the "Periodically" setting is configured for 30 minutes, the ORT Host may check for matching resources every 30 minutes.

Overlay Resource Trees may be implemented in any feasible manner. In example embodiments, a Service Layer (SL) may host a number of resources, which may be distributed across a Physical Resource Tree (PRT). During their lifetime, these resources may become part of one or more Overlay Resource Trees (ORTs). FIG. 9A illustrates an example of a PRT hosted on a server. The hierarchy of a PRT may be created "automatically" as resources are created on the server. For example, if a client issues a Create message, the Create message may specify a target resource where the new resource is to be created. A new parent-child relationship may then be created between the target resource and the newly created resource. FIG. 9B illustrates an Overlay Resource Tree associated with the PRT of FIG. 9A that has restructured the shaded resources into three hierarchical levels. As shown in FIG. 9, the ORT does not need to account for every resource in the PRT. For example, resources R2, R2_1, R2_2, R2_3, and R2_4 of FIG. 9A are not included in the ORT of FIG. 9B.

An <overlay> resource may define a single ORT. For example, the ORT depicted in FIG. 9B has the following staticOverlayTemplate:
  Root: Resource R0
  Branching Points:
    Root: Resource R1
    Resource R1: {Resource R3, Resource R4}
    Resource R3: {resource R5}
    Resource R4: null
    Resource R5: null However, as stated above, an ORT may be implemented in any feasible manner. Three example options are described below.

Figure 10A:
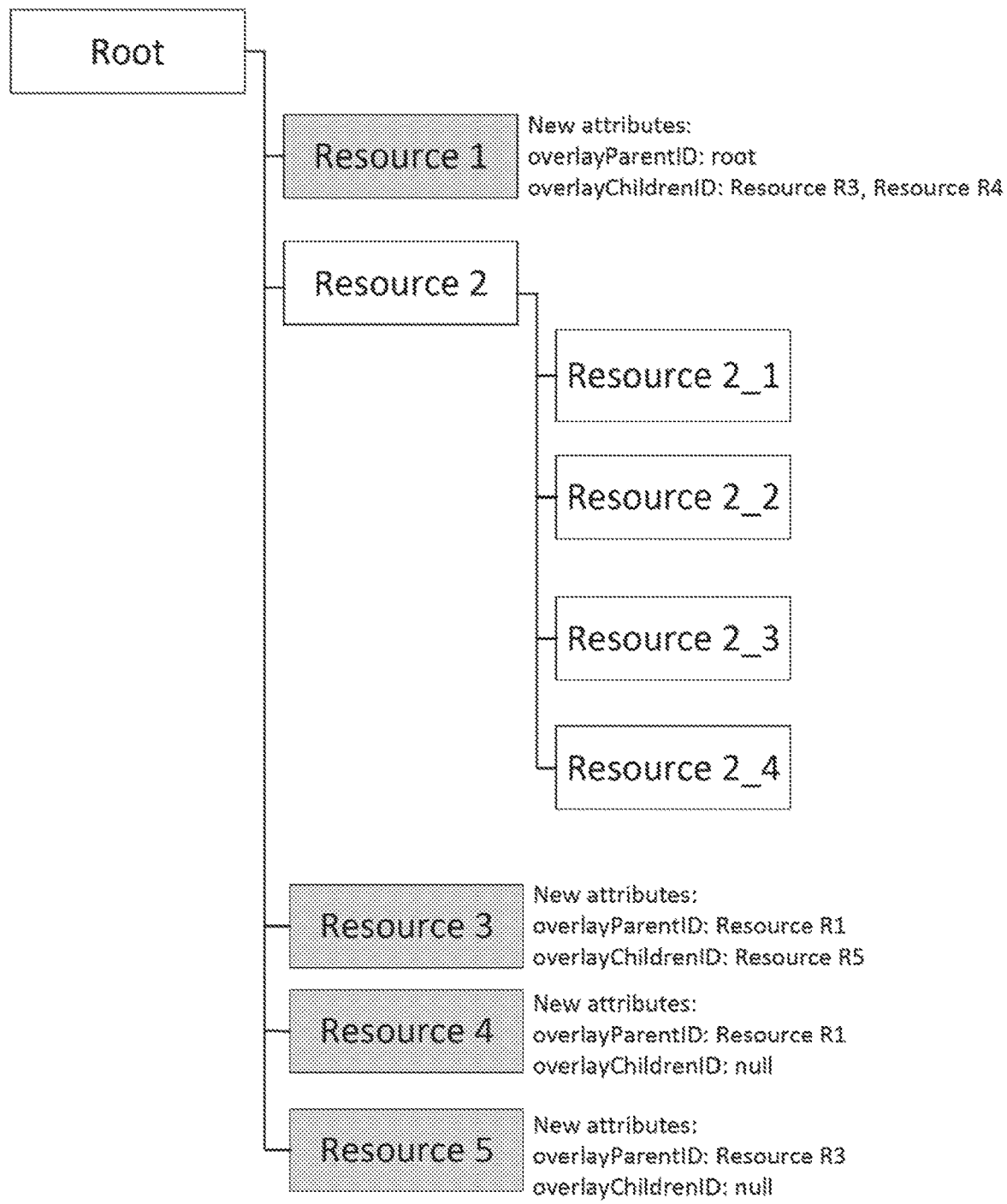

In a first example embodiment, illustrated in FIG. 10A as an "Attribute based" overlay, an ORT may be implemented by introducing an overlayFamily attribute to the resources in a PRT. An overlayFamily attribute may comprise the following sub-attributes:
  overlayParentID: This may be a list of resources that identify the overlay parents of the current resource.
  overlayChildrenID: This may list the child resources associated with a resource.
  overlayID: This may be an identifier associated with the overlay.

To implement the ORT of FIG. 9B in such an example embodiment, Resource R3 may have an overlayFamily attribute comprising the following attribute values: overlayParentID=Resource R1; overlayChildrenID=Resource R5; and overlayID=1.

The overlayParentID, overlayChildrenID, and overlayID sub-attributes may also be implemented as separate attributes of resources of the PRT.

Figure 10B:
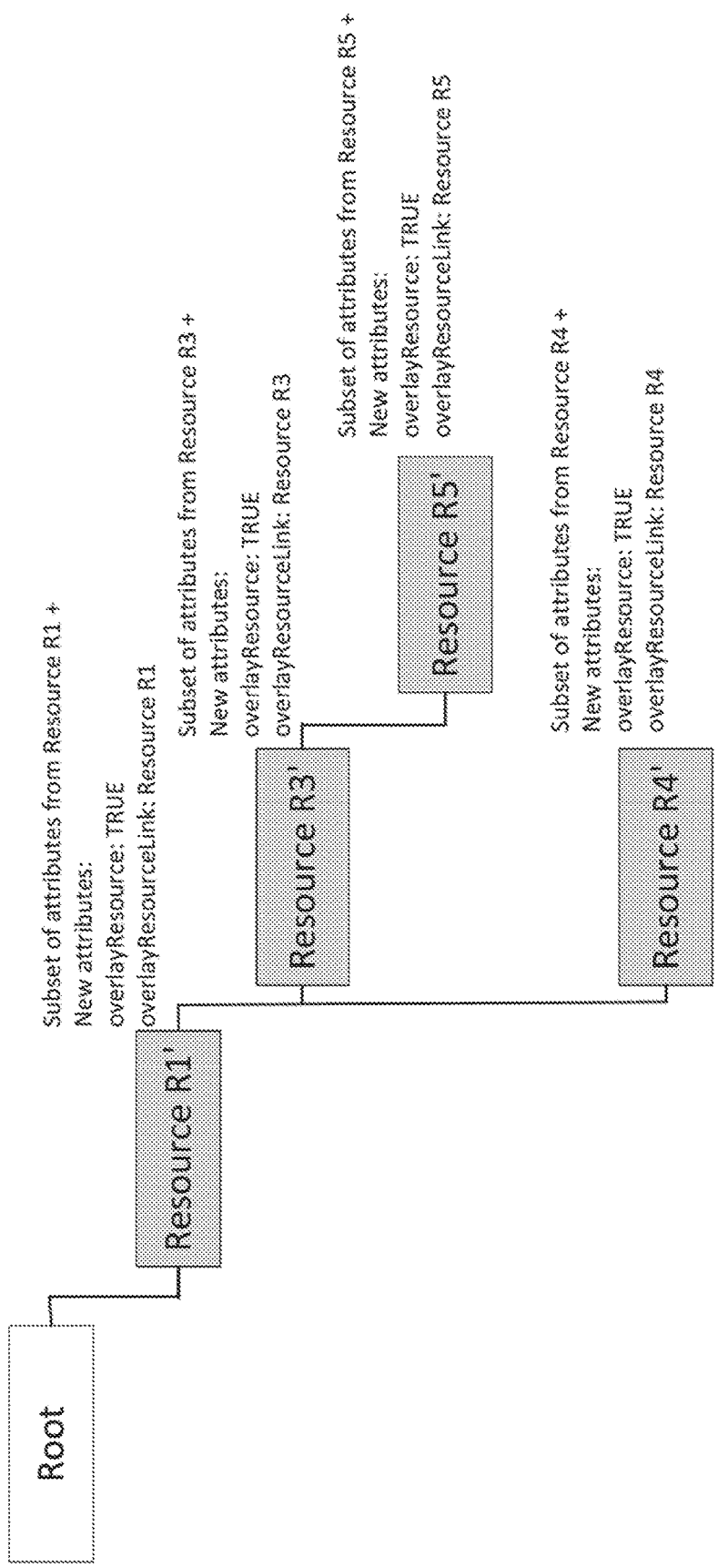

In a second example embodiment, illustrated in FIG. 10B as a "Link based" overlay, an ORT Host may create new stand-in overlay resources to match a desired ORT. Such overlay resources may act as replacements for physical resources and link to the actual physical resources. These overlay resources may have a set of attributes. For example, each new overlay resource may comprise the following attributes:
  overlayResource: This may be a Boolean to indicate that this resource is a stand-in for a resource in the PRT.
  overlayResourceLink: This may be a link to the actual physical resource in the PRT.
  overlayID: This may be an identifier associated with the overlay.

To implement the ORT of FIG. 9B in such an example embodiment, new resources R1', R3', R4', and R5' may be created. Each new resource may be marked as being an overlay resource, and each may link back to the original resource. For example, Resource R3' may comprise the above-describe attributes having the following values: overlayResource=TRUE; overlayResourceLink=Resource R3; and overlayID=1.

Further, in such embodiments, a new attribute may be added to the original resources in the PRT to indicate that the resources are part of an overlay. For example, an overlayID attribute may be added to a resource, which may comprise a reference to the ORTs associated with the resource.

In a third example embodiment, illustrated in FIG. 10C as a "Copy based" overlay, an ORT Host may create new overlay resources to match a desired ORT. Such resources may be copies of the physical resources, and may have new attributes. For example, the new resources may comprise the following new attributes:
  overlayResource: This may be a Boolean to indicate that this resource is a stand-in to a resource in the PRT.
  overlayID: This may be an identifier associated with the overlay.

It may be the responsibility of the ORT Host to ensure the physical resource and the overlay resource are synced. In such embodiments, the <overlay> resource may comprise a new overlayUpdate attribute that may determine an update rate for the ORT Host to follow to sync the overlay resources to the physical resources. Example settings for this new overlayUpdate attribute may comprise: update on change; update during off hours; update whenever overlay is accessed; and any other feasible update schedule.

To implement the ORT of FIG. 9B in such an example embodiment, new resources R1", R3", R4", and R5" may be created. Each new resource may be marked as being an overlay resource that is a copy of a real resource. For example, Resource R3" may be a copy of Resource R3 and may comprise the above-describe attributes having the following values: overlayResource=TRUE; and overlayID=1.

Further, in such embodiments, a new attribute may be added to the original resources in the PRT to indicate that the resources are part of an overlay. For example, an overlayID attribute may be added to a resource, which may comprise a reference to the ORTs associated with the resource.

Functional entities that may be involved in the creation, management, and maintenance of ORTs may include an ORT Producer, an ORT Host, and an ORT Repository, as shown in FIGS. 11-15.

Figure 11:
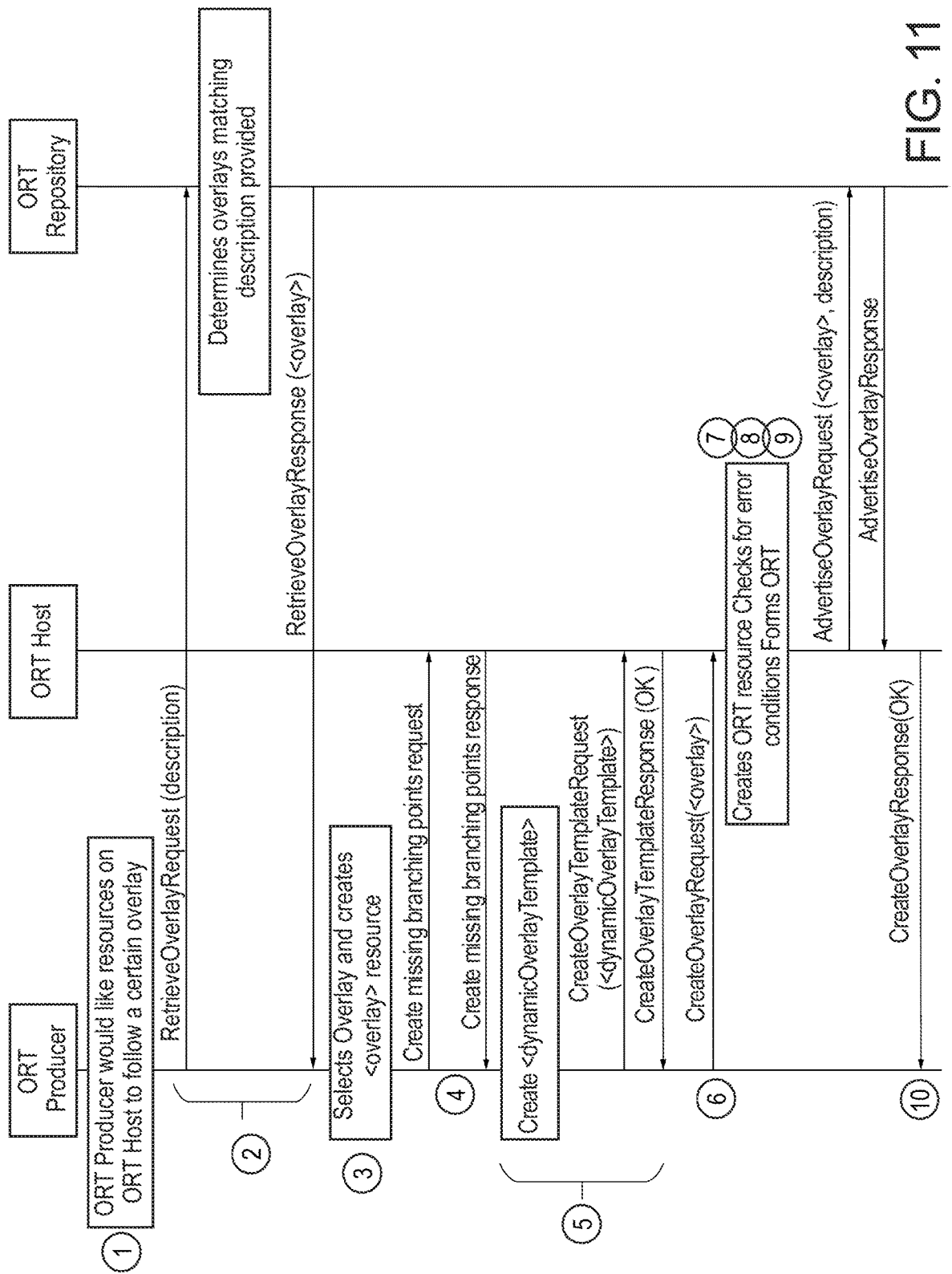
FIG. 11 illustrates an example sequence diagram for creating an ORT in an ORT Host.

FIG. 11 illustrates an example sequence diagram for creating an ORT in an ORT Host.

At step 1, an ORT Producer may determine it is desirable for resources hosted on an ORT Host to follow a particular overlay. The ORT Producer may determine the resources of interest and may determine that using the PRT of the resources may be inefficient. The ORT Producer may also be able to determine a priori that the PRT will be inefficient to use. The ORT Producer may be able to determine if a PRT will be inefficient to use based on the structure of the PRT. For example, if the PRT is not structured in a way that is desirable to the ORT Producer, such as being a flat tree.

At step 2a, ORT Producer may optionally issue a request to an ORT Repository requesting possible ORTs that match specified criteria. For example, the ORT Producer may determine that the resources to re-organize are of type T2 and from devices of manufacturer M2. The ORT Producer may query the ORT Repository for any ORTs created for such devices and/or resources.

At step 2b, assuming the ORT Producer performed step 2a, the ORT Repository may respond with <overlay> resources that match the requested criteria. Alternatively, the ORT Repository may respond with <dynamicOverlayTemplate> resources that match the requested criteria.

At step 3, the ORT Producer may select a desired ORT, determine attributes of the overlay, and construct the <overlay> resource, which may comprise the following attributes: overlayName, overlayID, staticOverlayTemplate, dynamicOverlayTemplateID, overlayAdvertise, overlayDiscoverable, overlayDescription, and any other relevant attributes.

At step 4, based on the ORT tree representation, the overlay may comprise branching points that are not in the PRT. The ORT Producer may create these branching points at the ORT Host. For example, assume a PRT stores temperature readings as child resources of the root resource, and an ORT Producer requires a tree structure based on the rooms the sensors are located, e.g., room1 or room2. In such an example, the ORT Producer may first create resources Room1 and Room2 in the ORT Host. Such resources may be referred to as branching point resources.

At step 5, if the ORT Producer intends to create an overlay with an optional dynamic template, the ORT Producer may create a <dynamicOverlayTemplate> resource on the ORT Host with appropriate 'mask' and 'action' attributes, as described above.

In an alternative Step 5, if an ORT Producer is aware of existing dynamic templates on the ORT Host, the ORT Producer may create an <overlay> resource with a dynamicOverlayTemplateID pointing to one of these existing templates.

At step 6, the ORT Producer may send a CreateOverlayRequest to the ORT Host. Such a request may comprise the overlay attributes from Step 3, above. Note that if the ORT Producer performs the optional Step 2, the ORT Producer has requested overlays from the ORT Repository. The ORT Repository may have zero or more matching overlays. The ORT Producer may decide to use such a matching overlay and can then create an <overlay> resource matching this overlay on the ORT Host.

At step 7, the ORT Host may create an <overlay> resource. If ORTs are supported, the ORT Host may proceed with the overlay creation. Otherwise, the ORT Host may issue a CreateOverlayResponse with a suitable error indication to the ORT Producer, and processing may continue with Step 10, below.

At step 8, the ORT Host may determine if branching points needed for the overlay are available in the PRT. For example, the ORT Host may check the staticOverlayTemplate attribute or the associated <dynamicOverlayTemplate>. If the branching points are available in the PRT, the ORT Host may proceed with the overlay formation. Otherwise, the ORT Host may issue a CreateOverlayResponse with a suitable error indication to the ORT Producer. Such a response may comprise the missing branching points so that the ORT Producer may create them. Processing may then continue with Step 10.

At step 9, the ORT Host may create the requested overlay. This generation may be performed immediately, or the ORT Host may wait for a scheduled activation time, as determined by an optional overlaySchedule attribute. While generating the overlay, the ORT Host may check for "resource consistency". For example, service layers may have rules that limit the type of child resources that may be hosted by a parent. In oneM2M, for example, a <contentInstance> may not be the child resource of a <flexContainer> resource. In such examples, the ORT Host may check if the overlay will violate these rules. In addition, each resource may have one or more attributes that denote whether this resource may be included in ORTs. For example, a resource may have a new overlayEligible attribute. Such a resource may only be included in an ORT if overlayEligible==TRUE.

If the <overlay> resource contains a staticOverlayTemplate attribute, the ORT Host may use this information to proceed with the overlay formation. As part of this overlay formation, the ORT Host may update attributes and/or create resources on the PRT. For example, the ORT Host may use one of the methods described above to create the overlay: Attribute Based; Link Based; or Copy Based.

If the <overlay> resource contains a reference to a dynamicOverlayTemplate and an action attribute is set to "update overlay", the ORT Host may autonomously go over the resources in its PRT to find those matching the 'mask' and may form the overlay by including these matching resources in an appropriate location in the ORT hierarchy. As part of such an overlay formation, the ORT Host may update attributes and/or create resources on the PRT. For example, the ORT Host may use one of the methods described above: Attribute Based; Link Based; or Copy Based.

The ORT Host may respond with a CreateOverlayResponse with a reference to the created <overlay> resource. In addition, if an overlayAdvertise attribute is TRUE, the ORT Host may advertise the created overlay resource to the ORT Repository.

If the overlay was not properly created, the ORT Host may issue a CreateOverlayResponse with a suitable error indication to the ORT Producer. Such a response may include an indication of the consistency check that failed. Processing may continue with Step 10.

At step 10, the ORT may be created. However, if the CreateOverlayResponse indicates a failure, the ORT Producer may try to resolve the error. For example, the ORT Producer may attempt to create the missing branching points identified in Step 8. The ORT Producer may then re-issue a new CreateOverlayRequest.

An ORT may need to be updated on an ORT Host. If a requester updates the <overlay> resource or its associated <dynamicOverlayTemplate> resource, the ORT Host may need to re-form the ORT. The requester may request to remove a branch from the ORT, to add a branch to the ORT, or to change the overlay template. For each request, the ORT Host may perform the following process. The ORT Host may check if the requester has access rights to update the ORT. If the requester is the ORT Producer of the ORT, then the ORT Host may re-form the overlay and may need to update attributes and/or create resources on the PRT. For example, the ORT Host may use one of the methods described above to re-form the ORT: Attribute Based; Link Based; or Copy Based. If the requester is not the ORT Producer of the ORT, the ORT Host may deny the request and/or may notify the ORT Producer that a requester has requested an update to the ORT. The ORT Producer may decide whether or not to allow the update.

An ORT may need to be deleted from an ORT Host. If the ORT Producer deletes the <overlay> resource, the ORT Host may need to update attributes and/or delete resources on the PRT. The ORT Host may have to perform a clean-up on the PRT, depending on which implementation option was used, such as Attribute Based, Link Based, or Copy Based implementations.

Maintaining an ORT on an ORT Host may comprise various methods and may differ based on implementation. For example, the create/update/delete ORT procedures described above may be well-suited for dynamic ORTs, but these ORT procedures assume a static PRT. In such cases, the ORT Producer may have determined the resources to include in the ORT and where in the resource tree hierarchy these resources are to be located. For example, these resources may have been found by a prior resource discovery operation.

As resources in the PRT are created or updated, they may not be automatically included in an ORT. To address this issue, the ORT Host may use the <dynamicOverlayTemplate> resource. Potential 'action's may be defined for this resource. For example, two actions may be the "send notification" action and the "update overlay" action.

Using the "send notification" action, an ORT Producer may subscribe to be notified when a resource that matches the overlay template is created or updated. It is assumed that the ORT Producer has created an <overlay> resource that points to one or more <dynamicOverlayTemplate> resources on the ORT Host. The <dynamicOverlayTemplate> resource may have 'action' set to "send notification". The ORT Host may associate a "send notification" action with a subscription request to notify the ORT Producer if a resource matching the 'mask' is created, updated, or deleted. Any time a resource matching the 'mask' is created, updated, or deleted, ORT Host may issue a notification to the ORT Producer with a link to the resource that matches the template mask.

Using the "update overlay" action, an ORT Producer may authorize the ORT Host to autonomously include resources that match the overlay template mask in the ORT. It is assumed that the ORT Producer has created an <overlay> resource that points to one or more <dynamicOverlayTemplate> resources on the ORT Host. The <dynamicOverlayTemplate> resource may have 'action' set to "update overlay". Any time a resource matching the 'mask' is created or updated, the ORT Host may use the 'action detail' attribute of the <dynamicOverlayTemplate> to determine the desired location of the resource in the ORT.

Figure 12:
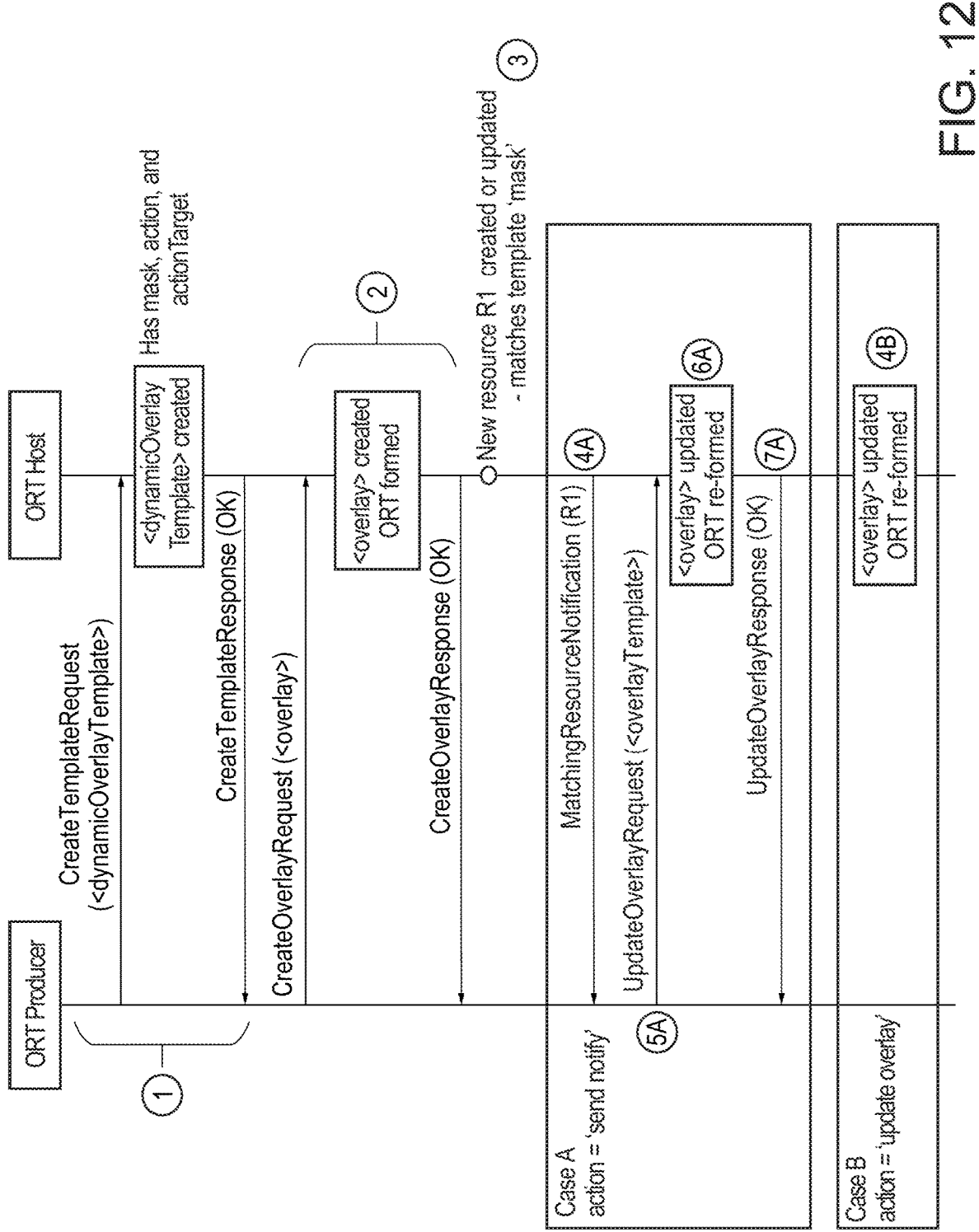
FIG. 12 illustrates an example sequence diagram for updating an ORT as resources are created and/or updated in a corresponding PRT.

FIG. 12 illustrates an example sequence diagram for updating an ORT as resources are created and/or updated in a corresponding PRT.

At step 1, the ORT Producer may create a <dynamicOverlayTemplate> resource on the ORT Host. The <dynamicOverlayTemplate> may define a 'mask' and an 'action'. If the 'action' is set to "update overlay", the <dynamicOverlayTemplate> may further define the 'action detail' attribute. In FIG. 12, the 'mask' and 'action' may be set as follows:

Case A:
'mask': resource type=T1, creator=C1, Manufacturer=M1
'action': "send notification"

Case B:
'mask': resource type=T1, creator=C1, Manufacturer=M1
'action': "update overlay"
'action detail': parent=R2

At step 2, the ORT Producer may create an <overlay> resource on the ORT Host. The <overlay> resource may link to the <dynamicOverlayTemplate> created in Step 1. The ORT Host may form the ORT (e.g., using one of the implementation methods describe above: Attribute Based; Link Based; or Copy Based). Based on a 'periodicity' associated with the template, the ORT Host may monitor resources to determine when a resource matching the 'mask' is created or when a resource update results in a resource matching the 'mask'.

At step 3, an action at the ORT Host may cause the creation of resource R1, which matches the 'mask'.

Steps 4A-7A may be performed for Case A in which, as described above, the 'action' may be set to "send notification".

At step 4A, the ORT Host may send a MatchingRequestNotification to the ORT Producer. As part of the notification, the ORT Host may provide the URI of the new resource R1.

At step 5A, the ORT Producer may determine whether or not to include resource R1 in the overlay. If yes, the ORT Producer may issue an UpdateOverlayRequest to the ORT Host with the new branch information.

At step 6A, the ORT Host may re-form the overlay to include the newly defined branch.

At step 7A, the ORT Host may confirm the overlay update with an UpdateOverlayResponse. Updating the ORT is now complete.

Step 4B may be performed for Case B in which, as described above, the 'action' may be set to "update overlay".

At step 4B, the ORT Host may autonomously re-form the overlay. The ORT Host may use the 'action detail' attribute to determine that resource R1 should be a child resource of resource R2. Updating the ORT is now complete.

When resources are deleted in the PRT, an ORT Host may need to perform clean-up actions to update ORTs that included the deleted resources. For example, for embodiments using a Copy-Based or Link-Based implementation, the ORT Host may need to delete any branches of the ORT that stem from a deleted resource. In addition, the ORT Host may need to update the attributes of any resources that, as part of an ORT, were child resources of this deleted resource. In another example, in embodiments using an Attribute-Based implementation, the ORT Host may need to find all resources that have an overlayParentID pointing to the deleted resource, and remove the overlayFamily attribute associated with this resource.

ORT Consumers are functional entities that may interact with ORTs hosted on ORT Hosts. ORT Consumers may use the overlay information in the ORT Host to help guide the creation of the PRT and/or to provide enhanced CRUD capability. When helping to guide PRT creation, an ORT Consumer may discover the ORT that is most appropriate and may use such an ORT as an indication of the way the resource tree should be structured. The ORT Consumer may then proactively create the PRT so that the resulting tree follows the structure of the overlay. When providing enhanced CRUD capability, an ORT Consumer may issue enhanced CRUD requests to the ORT Host. For example, an ORT Consumer that is aware that a resource is part of an ORT may issue a retrieve request for this resource, which may allow the ORT Consumer to retrieve the resource and its associated child resources within a specific ORT. Additional detail regarding the guiding of PRT creation and the providing of enhanced CRUD capability is described below.

When guiding PRT creation, the ORT Consumer may typically not be able to determine a priori how to structure resources in a resource-hosting entity. Consequently, the ORT Consumer may send a request to the ORT Host, or ORT Repository, requesting how to structure resources of a specific type. The ORT Host/Repository may reply with an overlay for the ORT Consumer to follow. The ORT Consumer may then create the resources in the resource-hosting entity (in the PRT) following the structure of the overlay provided in the reply. In example embodiments, the ORT Consumer may select an overlay and subsequently create resources that adhere to the hierarchy of the overlay. In this example, the overlay information is used by the ORT Consumer to form the PRT.

Figure 13:
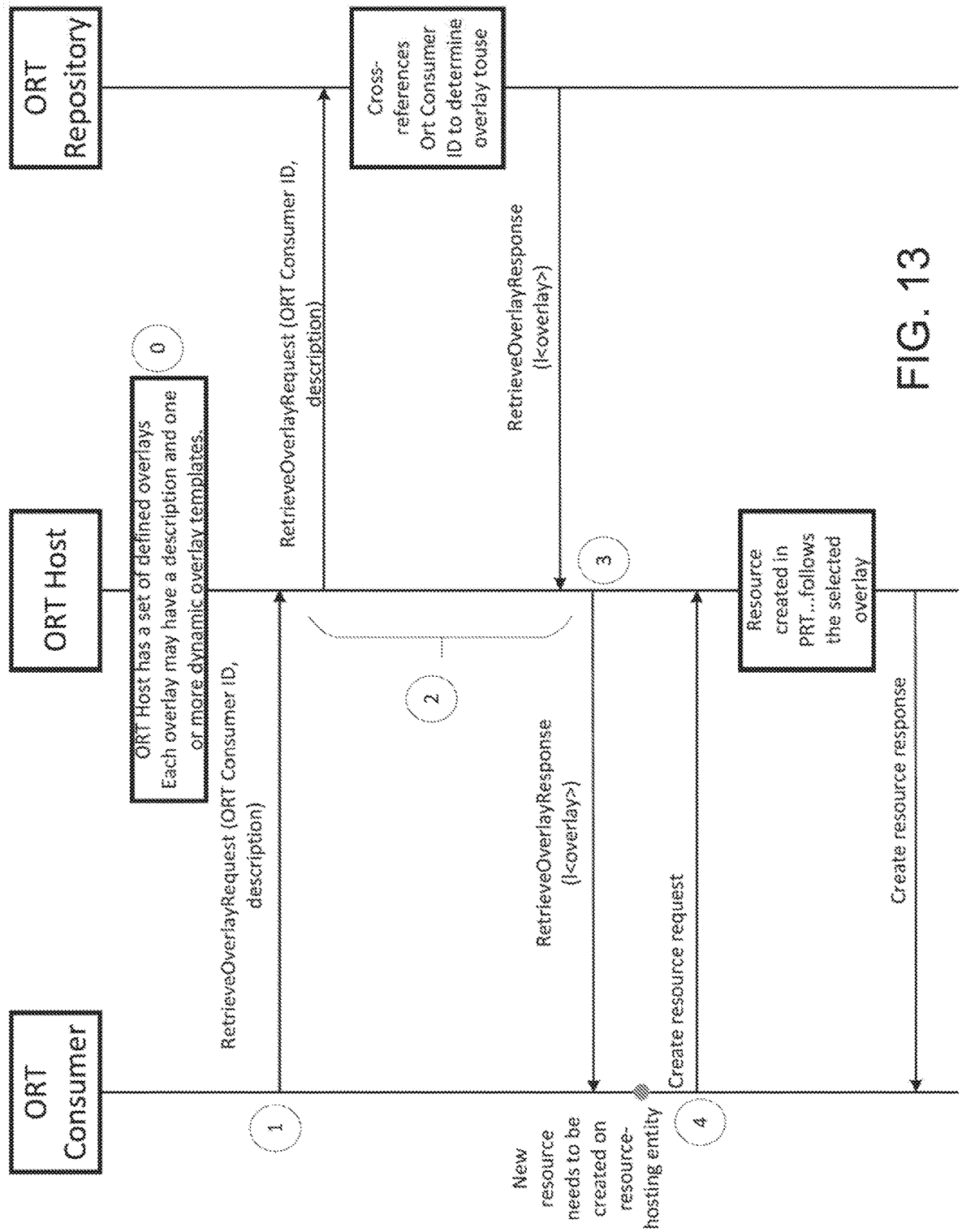
FIG. 13 illustrates an example sequence diagram for an ORT Consumer guiding PRT creation.

FIG. 13 illustrates an example sequence diagram for an ORT Consumer guiding PRT creation.

At step 0, it is assumed that an ORT Host has set of ORTs defined. Each ORT may be associated with a single <overlay> resource and one or more <dynamicOverlayTemplate> resources.

At step 1, an ORT Consumer may send a request to determine a suitable ORT. This request may comprise an ORT Consumer identifier, a description for a desired ORT, and/or other information that may help the ORT Host select an overlay for the ORT Consumer, e.g., location, manufacturer, resource type, and other relevant information. Such a request may be sent using an OverlayDiscoveryRequest message, or the request may be part of the registration procedure for the ORT Consumer.

At step 2, the ORT Host may determine an ORT to satisfy the request. The ORT Host may use the provided ORT information to select an ORT that the ORT Host hosts. Alternatively, the ORT Host may query the ORT Repository to retrieve matching overlays and/or overlay templates. For example, the ORT Repository may be pre-provisioned with overlays and/or overlay templates to use for specific ORT Consumer identifiers.

At step 3, the ORT information may be returned to the ORT Consumer. For example, such ORT information may include a representation of the <overlay> resource and/or one or more <dynamicOverlayTemplate> resources.

At step 4, if/when the ORT Consumer creates a resource on the ORT Host (resource-hosting entity), the ORT Consumer may follow the selected overlay.

Additionally, the overlays may include a 'forPRT' attribute that may signal that such overlays may be used for guiding PRT creation.

The above call flow may also be extended to cases where an ORT Consumer finds an ORT on a first ORT Host and uses this ORT to guide PRT creation on a second ORT Host.

An ORT Host may provide enhanced CRUD capability for an ORT Consumer to utilize. In the example embodiments described below, it is assumed that the ORT is implemented using the Attribute-based approach. However, it should be understood that the presented solutions may also apply to the other implementation methods. It is also assumed in embodiment described below that the ORT is created prior to the CRUD operation. However, it should be understood that ORT creation may be combined with the CRUD operation.

For the Create operation, an ORT Consumer may typically not be able to determine a priori how to structure resources in a resource-hosting entity. Consequently, the ORT Consumer may use a default behavior for creating resources on the resource-hosting entity. For example, temperature sensors may have a default behavior to create all resources containing temperature measurements under the root of the PRT. Typically, such behavior may result in a flat tree hierarchy, with all resources from similar devices stored under the same branching point. In such examples, the resource-hosting entity, acting as an ORT Host, may form an ORT to match a selected overlay.

Figure 14:
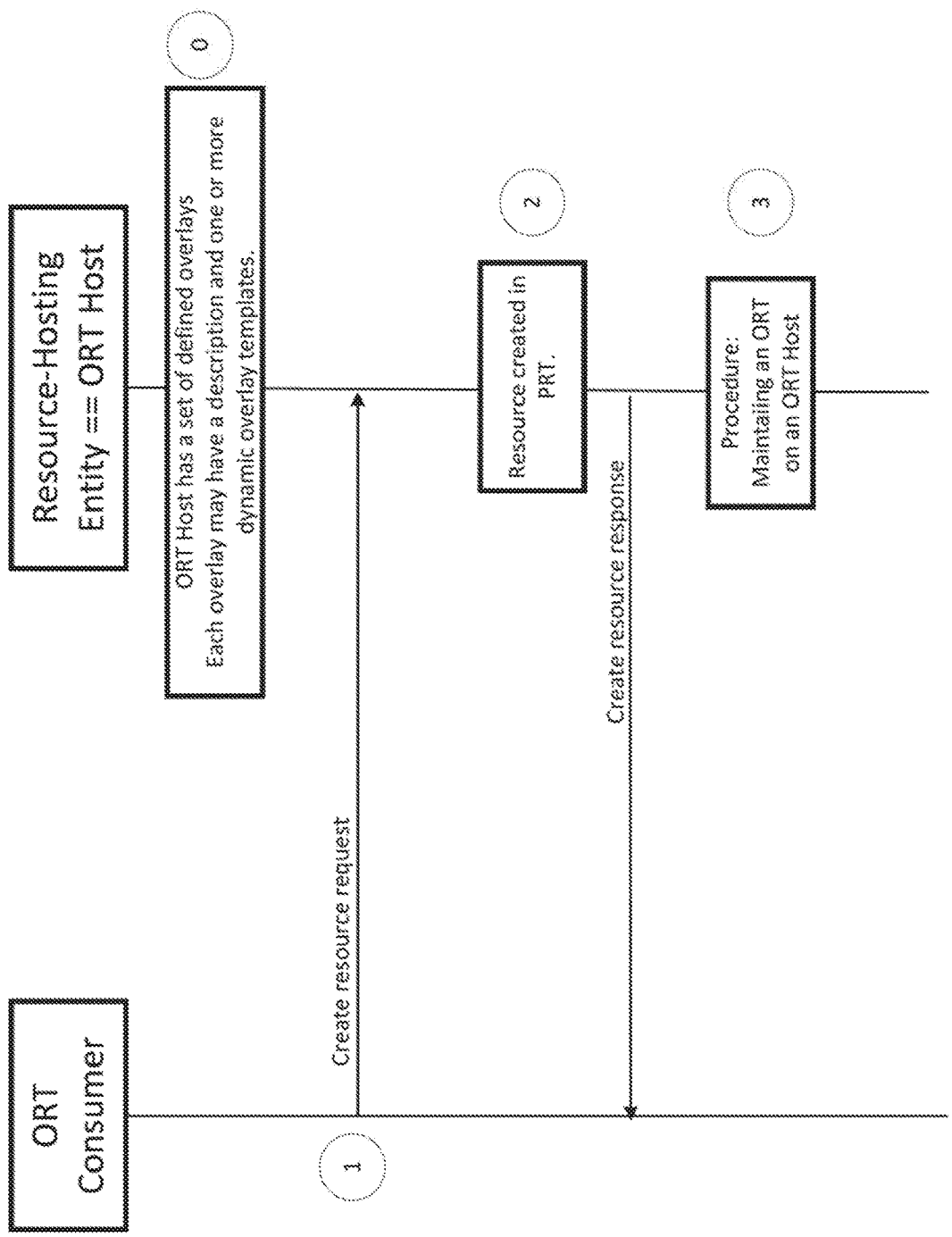
FIG. 14 illustrates an example sequence diagram for an ORT Consumer utilizing an enhanced Create operation.

FIG. 14 illustrates an example sequence diagram for an ORT Consumer utilizing an enhanced Create operation provided by an ORT Host.

At step 0, it is assumed that a resource-hosting entity, such as an ORT Host, has set of ORTs defined. Each ORT may be associated with a single <overlay> resource and one or more <dynamicOverlayTemplate> resources.

At step 1, an ORT Consumer may send a create request to the ORT Host. As part of the request, the ORT Consumer may optionally indicate to the ORT Host if the resource may be included in an ORT. Such an indication may be made using the new overlayEligible attribute.

At step 2, the resource may be created in the PRT using its default behavior.

At step 3, if the resource is marked as overlayEligible=TRUE, the ORT Host may use the procedure described with respect to FIG. 12, above. As part of this procedure, the ORT Host may monitor resource creation to determine if the resource matches the template mask, and if so, may take the action associated with the template.

Alternatively, the ORT Consumer may first query the ORT Host to determine the ORTs that it hosts. Then, when issuing the Create request in Step 1, the ORT Consumer may tell the ORT Host to include the created resource in one or more ORTs.

An ORT Host may provide an enhanced Retrieve operation. An example process for such an operation is described as follows.

At step 0, it is assumed that an ORT Consumer has discovered that the resources of interest are under a single parent resource, R1, in one particular ORT, ORT 1. For example, the ORT Consumer may determine to retrieve resources R1, R2, and R3, which may be located in different branches of the PRT. The ORT Consumer may also determine that in ORT1, R2 and R3 are child resources of R1.

At step 1, the ORT Consumer may issue a Retrieve request to this parent resource (R1) and may indicate that the ORT Consumer wishes to apply the request to a specific ORT (ORT1) and retrieve all child resources of resource R1.

At step 2, an ORT Host may receive the request and may apply the request to ORT1. The ORT Host may prepare a Retrieve response that may comprise a representation of the child resources of R1 belonging to ORT1. It may be possible for the child resources to be in different branches of the PRT. Additionally, the ORT Host may need to perform access rights checks before executing the Retrieve operation on the child resources.

An ORT Host may provide an enhanced Update operation. An example process for such an operation is described as follows.

At step 0, it is assumed that an ORT Host has set of ORTs defined. Each ORT may be associated with a single <overlay> resource and one or more <dynamicOverlayTemplate> resources.

At step 1, an ORT Consumer may issue an update request to the ORT Host. As part of the request, the ORT Consumer may optionally indicate to the ORT Host whether or not the resource may be included in an overlay. Such an indication may be made using the new overlayEligible attribute.

At step 2, the resource may be updated in the PRT using the default behavior of the PRT.

At step 3, if the resource is marked as overlayEligible=TRUE, the ORT Host may use the procedure described with respect to FIG. 12, above. As part of this procedure, the ORT Host may monitor resource updates to determine if the resource matches the template mask, and if so, may take the action associated with the template.

Alternatively, the ORT Consumer may first query the ORT Host to determine the ORTs that it hosts. Then, when issuing the Update request in Step 1, the ORT Consumer may tell the ORT Host to include the updated resource in one or more ORTs.

An ORT Host may provide an enhanced Delete operation. An example process for such an operation is described as follows.

At step 0, it is assumed that an ORT Consumer has discovered that the resources of interest are under a single parent resource, R1, in one particular ORT, ORT 1.

At step 1, the ORT Consumer may issue a Delete request to this parent resource (R1) and may indicate that the ORT Consumer wishes to apply the request to a specific ORT (ORT1) and delete all child resources of resource R1.

At step 2, an ORT Host may receive the request and may apply the request to ORT1. The ORT Host may delete resource R1 and all child resources of R1 belonging to ORT1. It may be possible for the child resources to be in different branches of the PRT. Additionally, the ORT Host may need to perform access rights checks before executing the Delete operation on the child resources.

An ORT Host may provide an enhanced Discover operation. An example process for such an operation is described as follows.

At step 0, it is assumed that an ORT Consumer has determined that the desired resources are under a specific ORT, ORT1.

At step 1, the ORT Consumer may issue a Discover request targeting this specific ORT (ORT1). In such a discovery request, the ORT Consumer may include a set of discover conditions, such as, for example, filter criteria, an initial starting point of the discovery, the number of levels to search, a limit on the number of returned results, and other relevant conditions.

At step 2, an ORT Host may receive the request and may perform the discovery operation on ORT1. The ORT Host may prepare a Discovery response, which may include a representation of resources in ORT1 that match the set of discover conditions.

For each of the operations described above, CRUD+ discovery, it is assumed that the ORT Consumer may include a specific overlay to apply the methods to. In example embodiments, it should be understood that the ORT Consumer may specify a list of overlays and may specify the PRT; alternatively, the lack of an ORT in a request may be assumed to be a request targeting the PRT.

An ORT Consumer may be able to use overlay operations. As described above, overlays may provide opportunities for service layers to offer enhanced operations to ORT Consumers. This is at least partially because such overlay operations may be tied to resource tree branching points. These overlay operations, described below, may have access to the entire set of child resources associated with a specified branching point. Typical call flows showing how these operations may be used are provided in FIGS. 14*a* and 15.

Figure 14A:
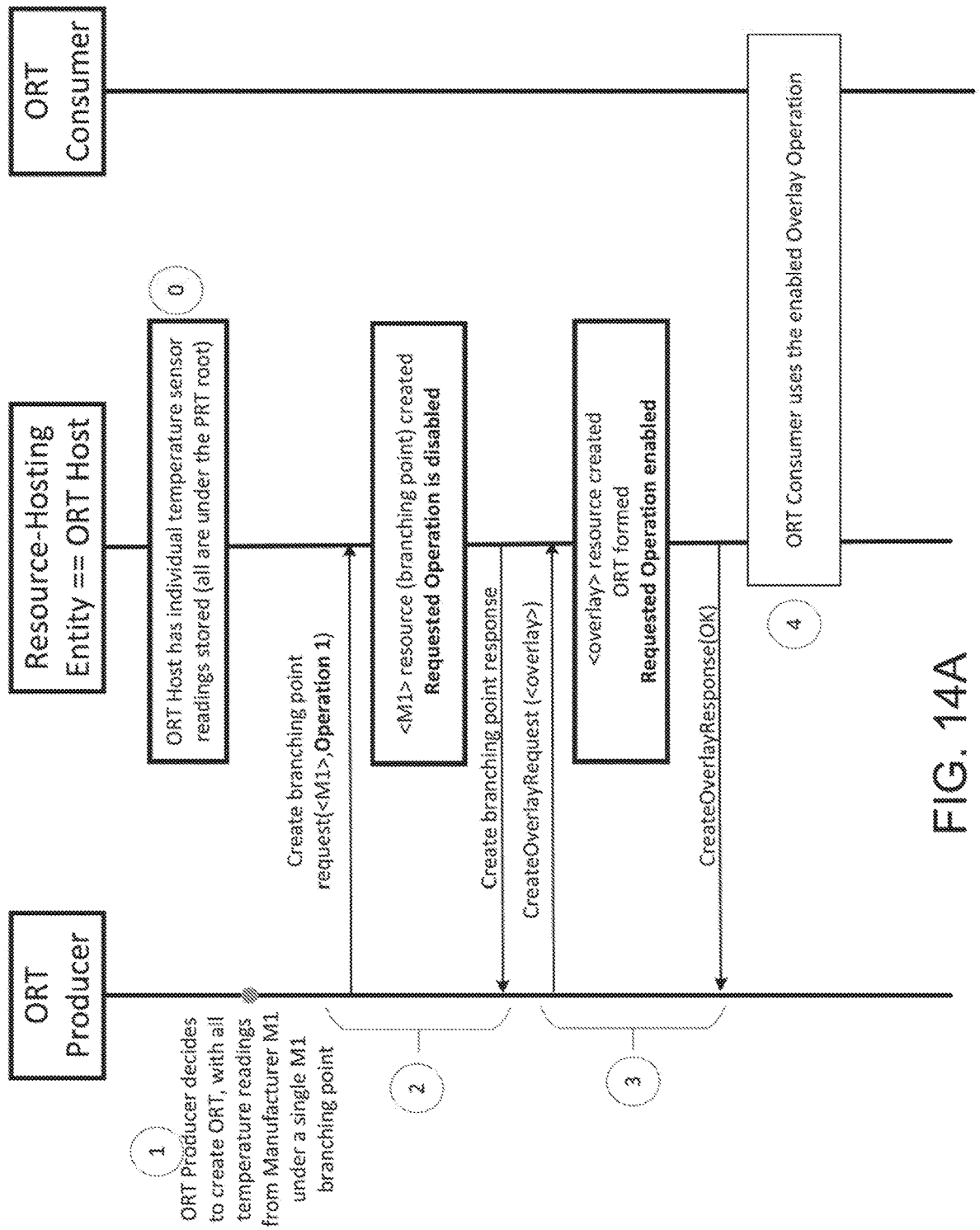
FIG. 14A illustrates an example sequence diagram to enable an ORT Consumer to use an overlay operation generated at the time an ORT is formed.

FIG. 14*a* illustrates an example sequence diagram to enable an ORT Consumer to use an overlay operation generated at the time an ORT is formed.

At step 0, it is assumed that a resource-hosting entity, such as an ORT Host, has resources from K sensors. In an example embodiment, resources may store the latest temperature readings recorded by K temperature sensors. K1 of these sensors may be from Manufacturer 1, while K2 may be from other manufacturers, and wherein K1+K2=K. An ORT Producer has determined that Manufacturer 1 stores its readings in units of Celsius. Furthermore, these sensors have little, if any, a priori knowledge about the structure of the PRT, so the resources are created as direct child resources of the root of the PRT.

At step 1, an ORT Producer may determine that it would like the resources from the K1 sensors from Manufacturer 1 to be under a single parent resource, M1. The ORT Producer may define an overlay with a new M1 branching point and with the K1 resources as child resources of this new M1 resource. The ORT Producer may also determine to enable a new enhanced operation, Operation 1, for the branching point and its child resources.

At step 2, the ORT Producer may create an M1 branching point resource, and may define that this branching point should offer the overlay operation, Operation 1. Typical operations that may be offered are described below.

At step 3, the ORT Producer may issue a CreateOverlayRequest to the ORT Host. The request may comprise the <overlay> resource. The ORT Host may create the <overlay> resource and may form the defined ORT. The ORT Host may also enable Operation 1.

At step 4, an ORT Consumer may take advantage of enabled Operation 1.

Figure 15:
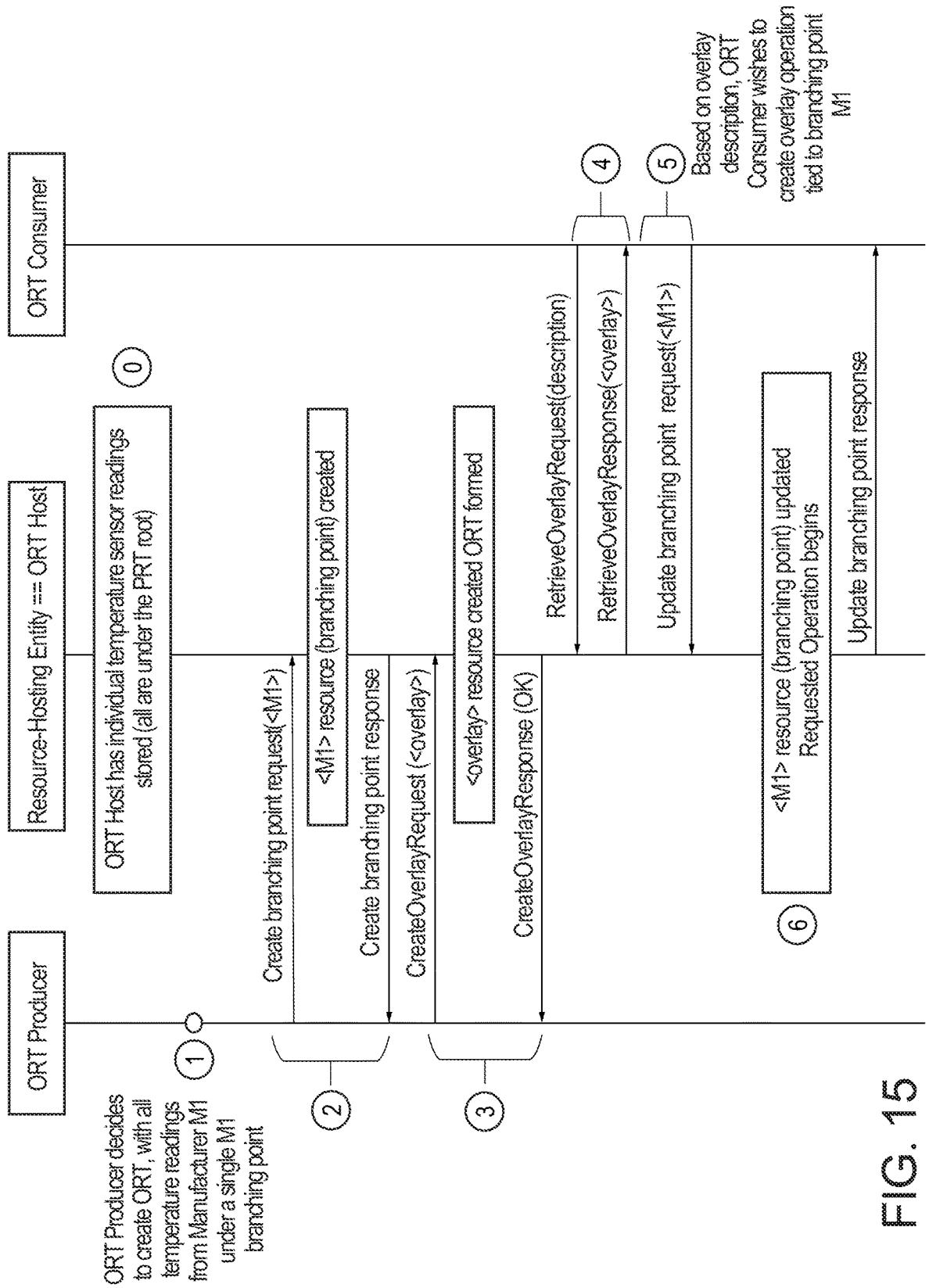
FIG. 15 illustrates an example sequence diagram to enable an ORT Consumer to use an overlay operation enabled by the ORT Consumer.

FIG. 15 illustrates an example sequence diagram to enable an ORT Consumer to use an overlay operation explicitly enabled by the ORT Consumer.

At step 0, it is assumed that a resource-hosting entity, such as an ORT Host, has resources from K sensors. In an example embodiment, resources may store the latest temperature readings recorded by K temperature sensors. K1 of these sensors may be from Manufacturer 1, while K2 may be from other manufacturers, and wherein K1+K2=K. An ORT Producer has determined that Manufacturer 1 stores its readings in units of Celsius. Furthermore, these sensors have little, if any, a priori knowledge about the structure of the PRT, so the resources are created as direct child resources of the root of the PRT.

At step 1, an ORT Producer may determine that it would like the resources from the K1 sensors from Manufacturer 1 to be under a single parent resource, M1. The ORT Producer may define an overlay with a new M1 branching point and with the K1 resources as child resources of this new M1 resource. The ORT Producer may also determine to enable a new enhanced operation, Operation 1, for the branching point and its child resources.

At step 2, the ORT Producer may create an M1 branching point resource.

At step 3, the ORT Producer may issue a CreateOverlayRequest to the ORT Host. The request may comprise the <overlay> resource. The ORT Host may create the <overlay> resource and may form the defined ORT.

At step 4, an ORT Consumer may retrieve the relevant overlays available at the ORT Host by issuing a RetrieveOverlayRequest. Such a request may comprise a description of the overlay requested.

At step 5, the ORT Consumer determines to create an overlay operation tied to branching point M1. The ORT Consumer may issue a request to update the M1 branching point resource.

At step 6, the ORT Host may update the branching point resource and may enable the requested operation.

New overlay operations may be defined for branching points that allow the branching points to collect numerical and/or statistical information related to the properties of the child resources (descendants) of each branching point. Such operations may be implicitly associated with the branching point resource type or may be associated with new attributes of the branching point. Examples of such overlay operations are as follows.

An example overlay operation may monitor the number of child resources of a branching point. Such information may be stored as an attribute of the branching point resource. Such an operation may also limit the number of descendent levels of hierarchy to monitor or may be applied to a specific descendent level (e.g., direct children, grandchildren, etc.) or to all descendants.

Another example overlay operation may monitor the time of last child resource update/creation/deletion/retrieval. Such information may be stored as an attribute of the branching point resource. Such an operation may be used to find the newest child resource or the oldest child resource. The operation may also be used to capture information related to time of deletion of a child resource. The operation may be applied to a specific descendent level (e.g., direct children, grandchildren, etc.) or to all descendants.

Yet another example overlay operation may monitor the size of the largest/smallest child resource and its identity. Such information may be stored as an attribute of the branching point resource. Such an operation may be used to keep track of the largest child resource or smallest child resource. For example, this information may be used by an ORT Consumer to better schedule retrievals of these resources. The operation may be applied to a specific descendent level (e.g., direct children, grandchildren, etc.) or to all descendants.

An additional example overlay operation may monitor the rate at which create/retrieve/update/delete requests are made to the descendants of a branching point. Such an operation may also limit the number of descendent levels of hierarchy to monitor or may be applied to a specific descendent level (e.g., direct children, grandchildren, etc.) or to all descendants.

Figure 16:
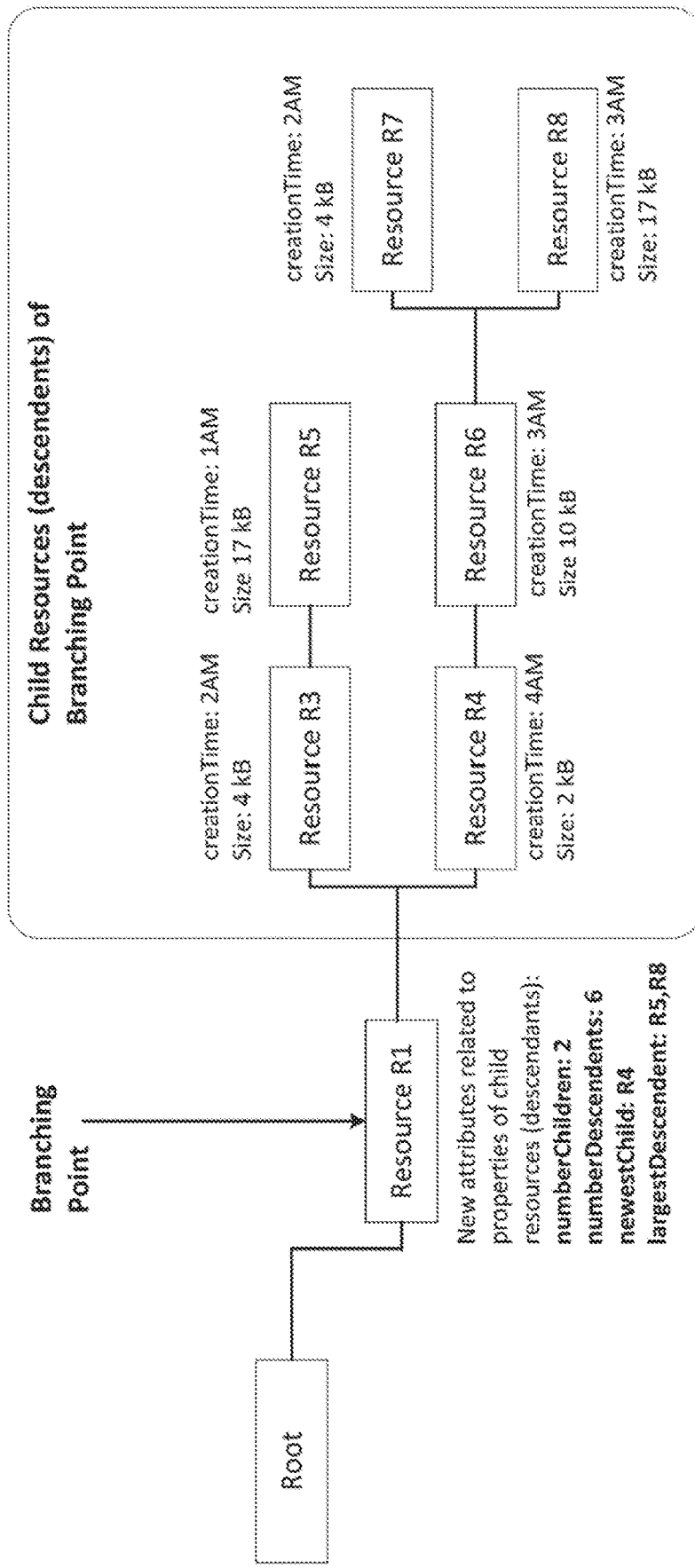
FIG. 16 illustrates example overlay operations.

Some of the above-described operations are shown graphically in FIG. 16, where Resource R1 is the branching point resource.

Some existing service layers, oneM2M for example, treat user/sensor/device metadata stored in the service layer as opaque. That is, the service layer is not able to determine the type of data or the format of stored metadata. However, with ORTs, an ORT Producer may structure an ORT such that the ORT Producer can guarantee that all child resources of a branching point are of the same type and have the same metadata format. For example, an ORT Producer may determine that a temperature sensor from manufacturer M1 stores its readings in units of Celsius. The ORT Producer may create an ORT with a single branching point to be the parent of all temperature sensor readings from devices of this manufacturer.

New overlay operations may be defined for branching points that allow the branching points to perform processing of metadata contained in the child resources (descendants) of each branching point. Such operations may be implicitly associated with the branching point resource type or may be associated with new attributes of the branching point. Examples of such overlay operations are as follows.

An example overlay operation may determine the minimum/maximum value among all child resources of a branching point. Such information may be stored as an attribute of the branching point resource. Such an operation may also limit the number of descendent levels of hierarchy to monitor or may be applied to a specific descendent level (e.g., direct children, grandchildren, etc.) or to all descendants.

Another example overlay operation may determine statistical information (mean, median, standard deviation, etc.) for the metadata in all child resources of a branching point. Such information may be stored as an attribute of the branching point resource. The operation may also limit the number of descendent levels of hierarchy to monitor or may be applied to a specific descendent level (e.g., direct children, grandchildren, etc.) or to all descendants.

Described herein are example embodiments for implementing the methods/enhancements described above to the oneM2M and OCF architectures.

Example oneM2M Embodiment

Figure 17:
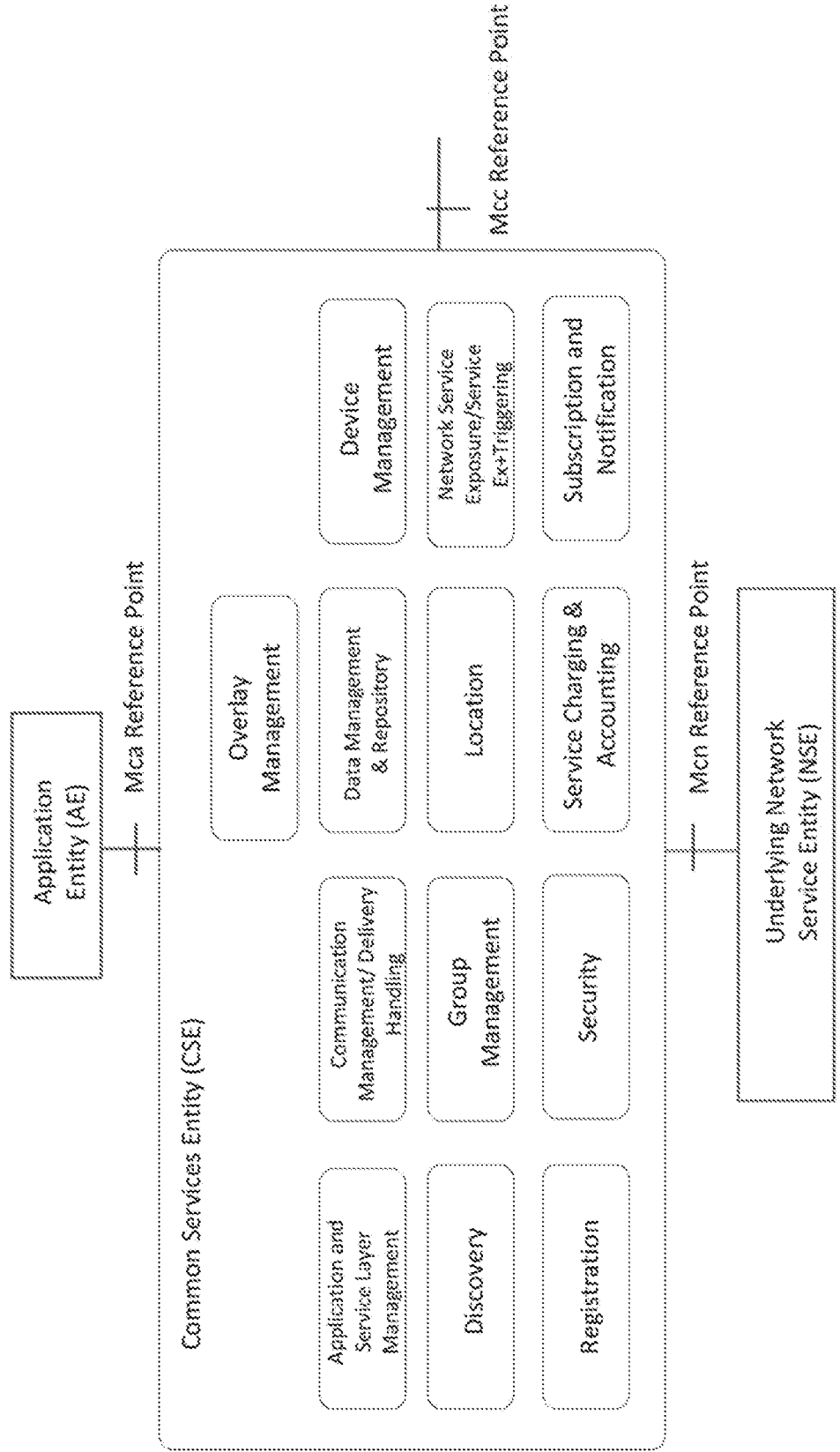
FIG. 17 illustrates an example embodiment of an Overlay Management CSF.

In oneM2M, the above methods and systems may be implemented in a new Overlay Management (OM) CSF, which may handle ORT processing at an ORT Host and ORT Repository. FIG. 17 illustrates an example embodiment of such an Overlay Management CSF.

The new Overlay Management CSF may be found in the IN-CSE as well as MN-CSEs and ASN-CSEs. This new OM may support procedures and processes defined for the ORT Host, ORT Producer, and ORT Consumer, as described above. In addition, AE may support procedures and processes defined for the ORT Producer and the ORT Consumer. The proposed resources and procedures related to the Service Layer may be implemented in a CSE.

Alternatively, the new functionality described herein may be implemented in an existing CSF, such as for example the Group Management CSF or the Data Management and Repository CSF.

Figure 18:
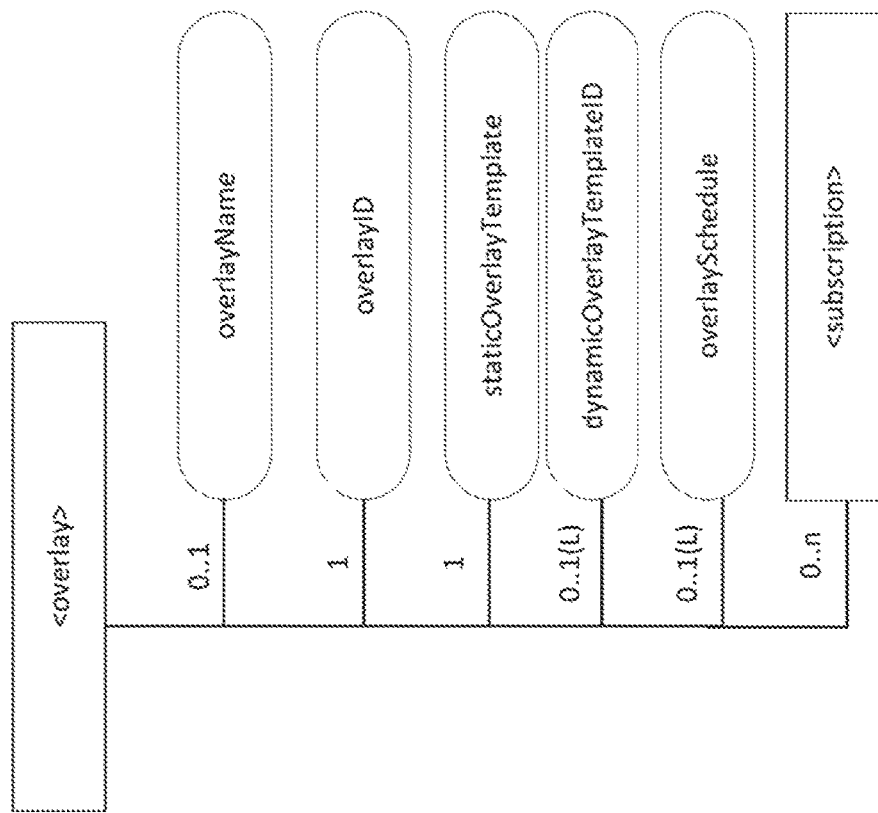
FIG. 18 depicts an example embodiment of an <overlay> resource.

The <overlay> resource may comprise the details of an ORT (i.e., root and branching points) as well as information to be used to help in discovery of such an ORT (e.g., overlayDescription, overlayAdvertise, overlayManufacturerList, and other relevant information). The <overlay> resource may be created in ORT Hosts (e.g., any resource-hosting CSE) and may also be announced in a collection of <overlay> resources in an ORT Repository, such as for example in the IN-CSE. The <overlay> resource may be Discovered by AEs and remote CSEs and may be Announced to remote CSEs. The <overlay> resource may reside under CSEbase. An example embodiment of an <overlay> resource is depicted in FIG. 18. Example attributes of the <overlay> resource are listed in Table 3.

TABLE 3

New attributes of <overlay> resource

| Attributes of <overlay> | Multiplicity | RW/RO/WO | Description |
| --- | --- | --- | --- |
| creator | 1 | RW | The AE-ID or CSE-ID of the entity that created the resource containing this attribute |

TABLE 3-continued

New attributes of <overlay> resource

| Attributes of <overlay> | Multiplicity | RW/ RO/ WO | Description |
|---|---|---|---|
| overlayName | 0 . . . 1 | RW | Human-readable name of overlay |
| overlayID | 1 | RW | Unique ID assigned to the overlay (within this CSE) |
| staticOverlayTemplate | 1 | RW | Representation of the ORT (in terms of root and branches) |
| dynamicOverlayTemplateID | 0 . . . 1(L) | RW | Link to optional template associated with this overlay |
| overlaySchedule | 0 . . . 1 | RW | Optional schedule associated with this overlay. If not present, the ORT may be formed immediately after <overlay> resource creation |

The overlayAdvertise attribute may be implemented through the oneM2M announceTo attribute. The overlayDescription and overlayManufacturerID attributes may be implemented through the oneM2M labels attribute.

In addition to the resource create process described in oneM2M, the creation of an <overlay> resource may comprise the following additional actions. The Hosting CSE may form the ORT at the appropriate time (e.g., immediately after <overlay> resource creation, at the time scheduled through the overlaySchedule attribute, or another appropriate time) and may update impacted resources.

Figure 19:
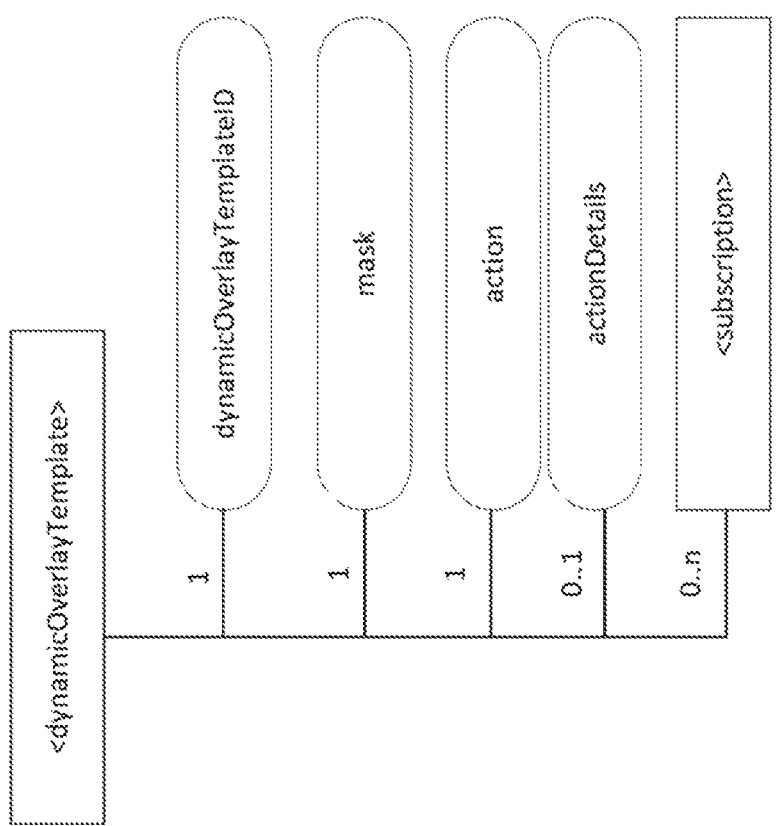
FIG. 19 depicts example embodiment of a <dynamicOverlayTemplate> resource.

The <dynamicOverlayTemplate> resource may provide a means for a Hosting CSE to dynamically include resources in an ORT or to send a notification to an entity that created the <overlay> resource. The <dynamicOverlayTemplate> resource may be linked to an <overlay> resource. The <dynamicOverlayTemplate> resource may reside under CSEbase. An example embodiment of a <dynamicOverlayTemplate> resource is depicted in FIG. 19. Alternatively, the <dynamicOverlayTemplate> resource may also reside as a child resource of an <overlay> resource. Example attributes of the <dynamicOverlayTemplate> resource are listed in Table 4.

TABLE 4

New attributes of <dynamicOverlayTemplate> resource

| Attributes of <dynamicOverlayTemplate> | Multiplicity | RW/ RO/ WO | Description |
|---|---|---|---|
| dynamicOverlayTemplateID | 1 | RW | Template identifier |
| mask | 1(L) | RW | List of key-value pairs used to find matching resources in the Hosting CSE. Example 'Keys': access rights, creator, parentID, creationTime, etc. |
| action | 1 | RW | Selects between one of two example actions tied to this template: send notification - when a matching resource is found, send notification to creator of <overlay> resource update overlay - when a matching resource is found, include the resource in the ORT defined by the <overlay> resource. Additional Details may be in actionDetails attribute |
| actionDetails | 0 . . . 1(L) | RW | Provides detail of what to do with a resource that matches the mask when action = = 'update overlay' actionDetails may be in the following form: Add: R1 This tells the Hosting CSE to add the matching resource to the ORT as a child resource of resource R1. If this is a List, there may be a one-to-one mapping to the entries in the mask attribute. As a result, resources matching the first mask entry may perform the first actionDetails entry. |
| periodicity | 0 . . . 1 | RW | How often the Hosting CSE should look for resources matching the 'mask'. Example valid options: always, one time, periodic |

In addition to the resource delete process described in oneM2M, the deletion of an <overlay> resource may comprise the following additional actions. The Hosting CSE may delete the ORT and may update impacted resources.

In addition to the resource create process described in oneM2M, the creation of a <dynamicOverlayTemplate> resource may comprise the following additional actions. If action='send notification', the Hosting CSE may autonomously create a <subscription> resource as a child of the <dynamicOverlayTemplate> resource. Such a subscription may be configured to send notifications to the <overlay> resource producer, including the URI of the resources that match the template. If action='update overlay', the Hosting CSE may monitor the created and updated resources to determine if they match the mask. If so, these resources may be included in the ORT. Similarly, if as a result of an update request a result no longer matches the mask, then this resource should be removed from the ORT.

Table 5 lists the new common attributes that have been defined to implement the functionality described above. These attributes assume that the Attribute Based approach is used to implement the ORT. Table 6 lists the new data types comprising the new overlayFamily attribute.

TABLE 5

New common attributes

| Attribute Name | Description |
| --- | --- |
| overlayFamily | Complex attribute that contains information related to overlay: Parent ID, List of Child IDs, overlay ID, and other relevant data. |
| overlayEligible | Boolean. Resource may be included in an overlay only if TRUE. |

TABLE 6

New data types in overlayFamily

| Element Name | Description |
| --- | --- |
| overlayParentID | The attribute may comprise a list of identifiers that point to parents of this resource. Each member of the list may correspond to a different overlay. There may be a one-to-one mapping between this list and the overlayID list. |
| overlayChildID | The attribute may comprise a list of a list of identifiers that point to the direct child resources of this resource. Each list of identifiers may correspond to a different overlay. There may be a one-to-one mapping between this list of overlay identifiers and the overlayID list. |
| overlayID | List of overlay IDs |

In addition, a number of additional parameters have been defined to manage the overlay operations offered as a result of the ORT. These attributes may be applied to any branching point resource and may be defined for different hierarchical levels (e.g., direct child resources, grandchild resources, all descendent resources, etc.). Note that Table 7 shows only a representative sample of attributes that may be associated with operations at a branching point. Other operations and attributes may be similarly defined.

TABLE 7

New common attributes for overlay operations

| Attribute Name | Description |
| --- | --- |
| numberChildren, numberGrandchilden, . . . numberDescendents | The attribute may comprise the number of child resources associated to this branching point. It may be defined at various hierarchical levels. |
| newestChild, newestGrandchild, . . . newestDescendent | The attribute may comprise the ID if the last child resource included under the branching point. It may be defined at various hierarchical levels. |
| oldestChild, oldestGrandchild, . . . oldestDescendent | The attribute may comprise the ID if the oldest child resource included under the branching point. It may be defined at various hierarchical levels. |
| largestChild, largestGrandchild, . . . largestDescendent | The attribute may comprise the ID if the largest child resource included under the branching point. It may be defined at various hierarchical levels. |
| smallestChild, smallestGrandchild, . . . smallestDescendent | The attribute may comprise the ID if the smallest child resource included under the branching point. It may be defined at various hierarchical levels. |
| maximumChild maximumGrandchild . . . maximumDescendent | The attribute may comprise the maximum value of the metadata stored in the child resources included under the branching point. It may be defined at various hierarchical levels. |
| minimumChild minimumGrandchild . . . minimumDescendent | The attribute may comprise the minimum value of the metadata stored in the child resources included under the branching point. It may be defined at various hierarchical levels. |
| averageChild averageGrandchild . . . averageDescendent | The attribute may comprise the average value of the metadata stored in the child resources included under the branching point. It may be defined at various hierarchical levels. |
| stdChild stdGrandchild . . . stdDescendent | The attribute may comprise the standard deviation value of the metadata stored in the child resources in under the branching point. It may be defined at various hierarchical levels. |

The following new Request parameter may be included in a Create/Update request: overlayEligible. If set to TRUE, this signals to the Hosting CSE that the resource being created may be included in an ORT. Such a parameter may be useful in embodiments where the Hosting CSE uses a template to autonomously form the ORTs. In some cases, an originator may not want the created resources to be included in other resource trees, and so the originator may set overlayEligible to FALSE.

The following new Request parameter may be included in a Create/Retrieve/Update/Delete request: overlayID. This new parameter may comprise the ID of a previously discovered overlay. If used in a Create, overlayID may signal the Hosting CSE to include the resource in the specified overlay. If used in a Retrieve, overlayID may signal the Hosting CSE to base the retrieve on the specified ORT. If used in a Delete, overlayID may signal the Hosting CSE to Delete the resource in the specified overlay. When deleting a resource in an ORT, the resource may still remain in the PRT. Alternatively, the Delete request to a specified ORT may include a new parameter to tell the Hosting CSE that the resource should also be deleted from the PRT, provided the requester has suitable access rights.

Table 8 lists new filter criteria to be included in Discovery requests. These new parameters may be used when discovering overlays hosted in an ORT Host or defined in an ORT Repository.

TABLE 8

New Discover Filter Criteria

| Condition tag | Multiplicity | Matching condition |
|---|---|---|
| description | 0 . . . n | The overlayDescription attribute of the <overlay> resource may comprise the description in the Condition Tag. |
| manufacturerID | 0 . . . n | The overlayManufacurerID attribute of the <overlay> resource may comprise the manufacturerID in the Condition Tag. |
| originatorID | 0 . . . n | The overlayConsumerID attribute of the <overlay> resource may comprise the originatorID in the Condition Tag. |
| overlayID | 0 . . . n | The overlayID attribute of the resource may be contained in the list of overlayIDs in the Condition Tag. |

Figure 20:
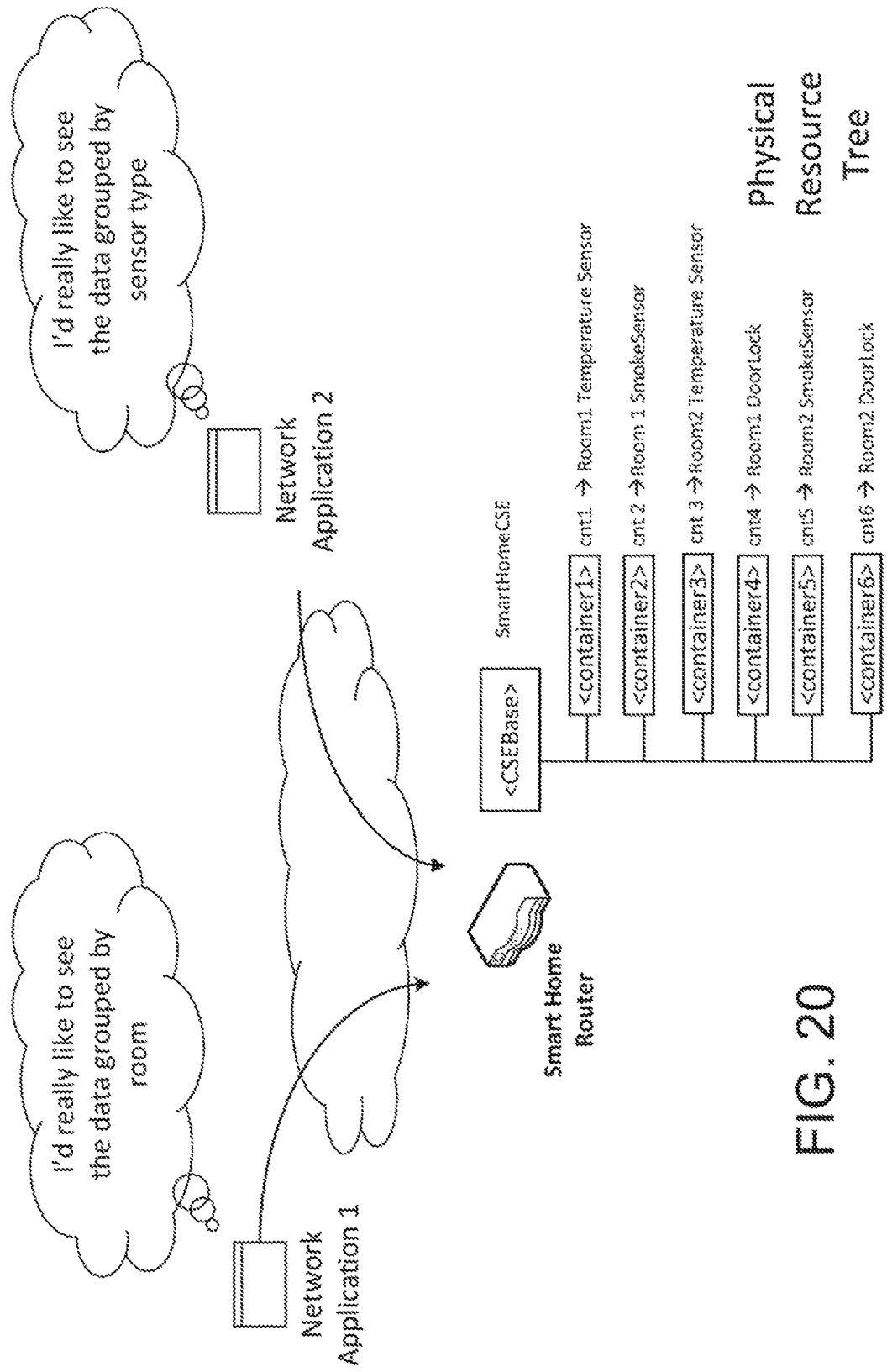
FIG. 20 illustrates two network applications accessing data stored in a PRT at the smart home router.

In the following oneM2M use case, a homeowner would like to convert his two room loft into a smart home. He purchases a smart home router which is equipped with a oneM2M service layer (MN-CSE) and installs this in a central location so that it has connectivity throughout his home. In addition, he buys small off-the-shelf sensors (temperature, door lock, and smoke) and installs these in each of the two rooms. The smart home router stores data collected from the sensors in <container> resources. The homeowner is not familiar with how to configure the sensors, so they store their data at a pre-configured default location—under the root resource of the Physical Resource Tree (<CSEBase> resource). In addition, there are two network applications that are remotely accessing this data (Network Application 1, Network Application 2). FIG. 20 illustrates the two network applications accessing the data stored in the PRT at the smart home router.

Figure 21:
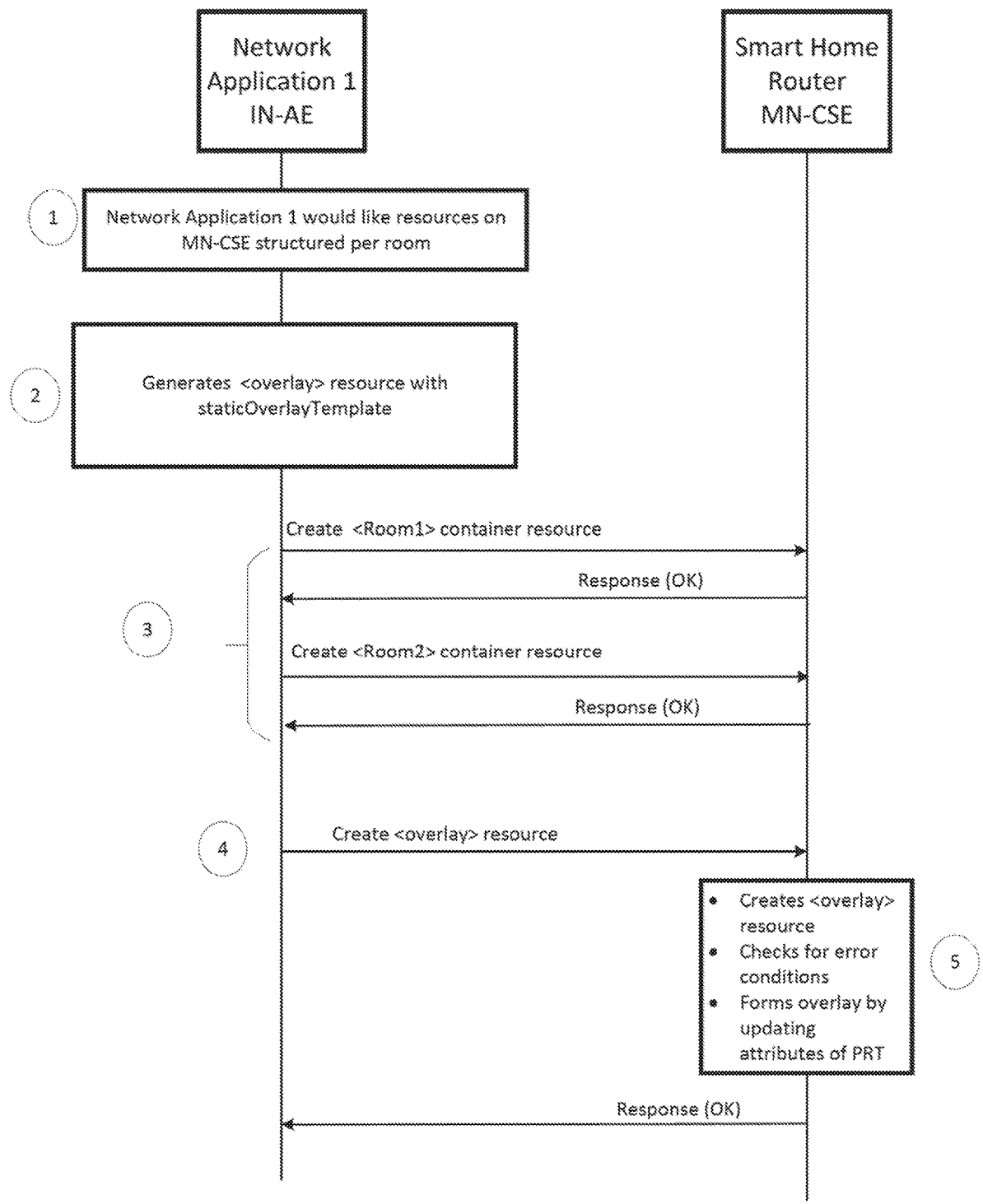
FIG. 21 illustrates an example sequence diagram for a network application to create an overlay in a smart home router.

Network Application1 would prefer to see the data structured per room. To achieve this, Network Application1 can act as a ORT Producer and create an overlay in the Smart Home Router. FIG. 21 illustrates an example sequence diagram for a network application, such as Network Application1, to create an overlay in a smart home router. It is assumed that Network Application1 has already discovered the resources on the MN-CSE and that all available resources are eligible to be included in overlays. This may be determined through local policies at the smart router and/or through the overlayEligible attribute associated with the discovered resources.

At step 1, Network Application1 comprises an API that prefers the container data structured by room.

At step 2, Network Application1 may generate the <overlay> resource representation. This resource has a staticOverlayTemplate that may define the static overlay as:

```
Root: SmartHomeCSE
Branching Points:
    Root: {SmartHomeCSE/Room1, SmartHomeCSE/Room2}
    Resource SmartHomeCSE/Room1: {
        SmartHomeCSE/cnt1,
        SmartHomeCSE cnt2
        SmartHomeCSE cnt4}
    Resource SmartHomeCSE/Room2: {
        SmartHomeCSE/cnt3,
        SmartHomeCSE/cnt5,
        SmartHomeCSE/cnt6}
```

At step 3, Network Application1 may determine that the MN-CSE is missing branching point <container> resources SmartHomeCSE/Room1 and SmartHomeCSE/Room2. As a result, Network Application 1 may create these resources.

At step 4, Network Application1 may issue a create <overlay> resource request to the MN-CSE.

At step 5, the MN-CSE may create the overlay resource. The MN-CSE may also determine if all impacted resources are overlay-eligible and if the created ORT has any resource inconsistencies. The MN-CSE may then form the ORT, ORT1. In so doing, the MN-CSE may modify the overlayFamily attribute of the impacted resources so that they are part of the newly created overlay.

Figure 22:
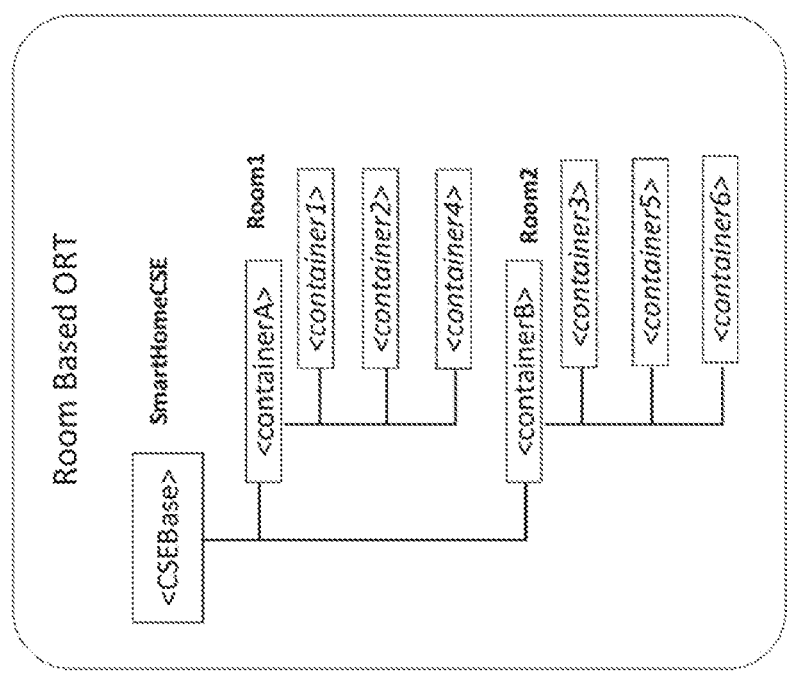
FIG. 22 illustrates an example ORT.

At the end of step 5, the MN-CSE has an overlay to the PRT, referred to as ORT1. FIG. 22 illustrates example overlay ORT1.

In parallel, Network Application2 would like to have the data structured by sensor type. It may also perform Step 1 to Step 6, with the following differences.

For step 3, Network Application2 may create the missing branching point container resources (i.e., Temperature, DoorLock, and SmokeSensor).

For Step 4, the staticOverlayTemplate may define a new ORT, ORT2, which may be based on sensor type:

```
Root: SmartHomeCSE
Branching Points:
```

-continued

```
Root: {SmartHomeCSE/Temperature,
SmartHomeCSE/Smoke Sensor, SmartHomeCSE/DoorLock}
Resource SmartHomeCSE/Temperature: {
SmartHomeCSE/cnt1,
SmartHomeCSE cnt3}
Resource SmartHomeCSE/SmokeSensor: {
SmartHomeCSE/cnt2,
SmartHomeCSE/cnt5}
Resource SmartHomeCSE/Doorlock: {
SmartHomeCSE/cnt4}
SmartHomeCSE cnt6}
```

Figure 23:
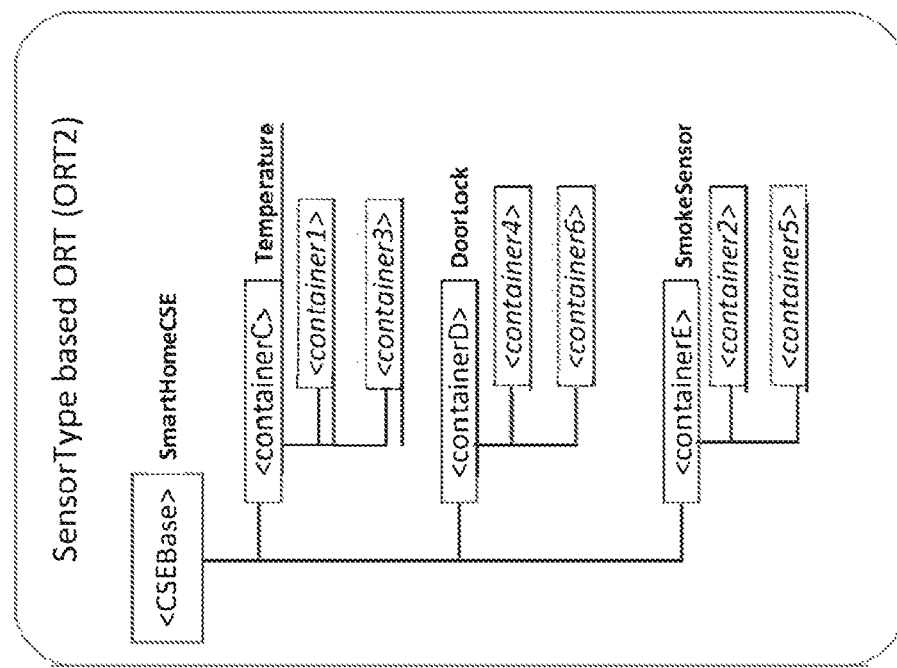
FIG. 23 illustrates another example ORT.

As a result, the MN-CSE may contain a second overlay to the PRT, referred to as ORT2. FIG. 23 illustrates example overlay ORT2.

Example OCF Embodiment

OCF uses a flat resource hierarchy for its resources. The ORT concept may be used to provide some hierarchy on top of this flat hierarchy. New definitions are introduced in order to implement the ORT with such a flat hierarchy: new resource types are defined; new common properties are defined for resources to help identify which overlay such resources are included in and where in the ORT these resources are located; a new interface type is defined to provide a view into the overlay resource and to define the requests and responses permissible on that view of the overlay resource; and new ORT interactions are defined.

Table 9 displays example new resource types.

TABLE 9

New Resource Types

| Name (informative) | Fixed URI | Resource Type (rt) | Short Description |
|---|---|---|---|
| overlayCollection | /overlayCollectionResURI | oic.wk.overlayList | resource type for a collection of <overlay> resources |
| overlay | /overlayResURI | oic.wk.overlay | resource type of specific <overlay> resource |
| dynamicOverlayCollection | /dynamicoverlayCollection ResURI | oic.wk.dynamicoverlay List | resource type for a collection of <dynamicOverlay> resources |
| dynamicOverlay | /dynamicOverlayResURI | oic.wk.dynamciOverlay | resource type of specific <dynamicOverlay> resource |

Resources of type oic.wk.overlayList may denote a generic collection resource. Such resources may support links with resource type oic.wk.overlay, which may denote <overlay> resources. An OIC client may issue a create request to an OIC Server to create the collection and/or issue a Read request on this resource to retrieve a list of overlays supported by the OIC server. The properties of resource type oic.wk.overlayList are defined below in Table 10.

TABLE 10

Properties of resource type: oic.wk.overlayList

| Property Title | Property Name | Value Type | Mandatory | Access Mode | Description |
|---|---|---|---|---|---|
| Identity | id | string | yes | Read Write | The id of the collection |
| Name | n | string | yes | Read Write | Human friendly name for the collection |
| Resource Types Supported | rts | string | yes | Read Only | The list of allowed resource types for links in the collection. Set to oic.wk.overlay |
| Overlay Links | links | array | no | Read Write | Web Link That Points to <overlay> resources |

Resources of type oic.wk.overlay may denote a generic collection resource that may have additional properties and that may have an optional link to the <dynamicOverlay> resource. As a result, the link may have resource type oic.wk.dyamicOverlay. An OIC client may issue a create request to an OIC Server to create the overlay and/or issue a Read request on this resource to retrieve the properties of the overlay. The properties of this resource type are defined below in Table 11.

TABLE 11

Properties of resource type: oic.wk.overlay

| Property Title | Property Name | Value Type | Mandatory | Access Mode | Description |
|---|---|---|---|---|---|
| Identity | id | string | yes | Read Write | Resource ID |
| Name | n | string | yes | Read Write | Human friendly name for resource |
| Resource Types Supported | rts | string | yes | Read Only | The list of allowed resource types for related links Set to oic.wk.dynamicOverlay |
| Dynamic Overlay Links | links | array | No | Read Write | Web Link that points to <dynamicOverlay> resource that is tied to this overlay |
| Static Overlay Template | staticOverlayTemplate | json | No | Read Write | Representation of the ORT (in terms of root and branches). Format could be JSON |
| Overlay Schedule | overlaySchedule | string | No | Read Write | Optional schedule associate with this overlay. If not present, the ORT may be formed immediately after creation of the resource of type: oic.wk.overlay |
| Overlay Description | overlayDescription | string | Yes | Read Write | Description of overlay - to be used in discovery operation related to overlays |

Resources of type oic.wk.dynamicOverlayList may denote a generic collection resource. Such resources may support links with resource type oic.wk.dynamicOverlay, which may denote <dynamicOverlay> resources. An OIC client may issue a create request to an OIC Server to create the collection and/or issue a Read request on this resource to retrieve a list of dynamic overlays supported by the OIC server. The properties of this resource type are defined below in Table 12.

TABLE 12

Properties of resource type: oic.wk.dynamicOverlayList

| Property Title | Property Name | Value Type | Mandatory | Access Mode | Description |
|---|---|---|---|---|---|
| Identity | id | string | yes | Read Write | The id of the collection |
| Name | n | string | yes | Read Write | Human friendly name for the collection |
| Resource Types Supported | rts | string | yes | Read Only | The list of allowed resource types for links in the collection. Set to oic.wk.dynamicOverlay |
| Dynamic Overlay Links | links | array | No | Read Write | Web Link That Points to <dynamicOverlay> resources |

Resources of type oic.wk.dynamicOverlay may denote the dynamic overlays hosted by the OIC Server. Such dynamic overlays may denote the details to be used by the OIC server to dynamically manage the resources it is hosting. An OIC client may issue a create request to an OIC Server to create and manage the dynamic overlay and/or issue a Read request on this resource to retrieve the properties of the dynamic overlay. The properties of this resource type are defined below in Table 13.

TABLE 13

Properties of resource type: oic.wk.dynamicOverlay

| Property Title | Property Name | Value Type | Mandatory | Access Mode | Description |
|---|---|---|---|---|---|
| Overlay Template Identity | id | string | yes | Read Write | Resource ID |
| Name | n | string | yes | Read Write | Human friendly name for resource |
| Mask | mask | CSV | yes | Read Write | CSV of strings denoting list of key-value pairs used to find matching resources on the OIC Server. Possible example keys include: resource type, interface type, name, etc. |
| Action | action | string | yes | Read Write | Selects between one of two example actions tied to this template: send notification - when a matching resource is found, send notification to creator of the resource of type oic.wk.Overlay update overlay - when a matching resource is found, include it in the ORT defined by the resource of type oic.wk.Overlay. Additional Details are in actionDetails property |

TABLE 13-continued

Properties of resource type: oic.wk.dynamicOverlay

| Property Title | Property Name | Value Type | Mandatory | Access Mode | Description |
|---|---|---|---|---|---|
| Action Details | actionDetails | CSV | no | Read Write | If CSV is a single string value, this property provides detail of what to do with a resource that matches the mask when action == 'update overlay' actionDetails may be in the following form: Add: R1 This tells the OIC Server to add the matching resource to the ORT, as a child resource of resource with ID R1. If a CSV of string values, there may be a one-to-one mapping to the entries in the mask property. |
| Periodicity | periodicity | string | no | Read Write | How often the OIC Server should look for resources matching the 'mask'. Example valid options: always, one time, periodic |

Table 14 lists the new common properties that have been defined to implement the functionality described above. These properties assume that the Attribute Based approach is used to implement the ORT. Table 15 lists the new data types comprising the new overlayFamily property.

TABLE 14

New Common Properties

| Property Name | Description |
|---|---|
| overlayFamily | Complex property that contains information related to overlay: Parent ID, List of Child IDs, overlay ID, and other relevant data. |
| overlayEligible | Boolean. Resource may be included in an overlay only if TRUE. |

TABLE 15

New data types in overlayFamily

| Element Name | Description |
|---|---|
| overlayParentID | The property may comprise a list of identifiers that point to parents of this resource. Each member of the list may correspond to a different overlay. There may be a one-to-one mapping between this list and the overlayID list. |
| overlayChildID | The property may comprise a list of a list of identifiers that point to the direct child resources of this resource. Each list of identifiers may correspond to a different overlay. There may be a one-to-one mapping between this list of overlay identifiers and the overlayID list. |
| overlayID | List of overlay IDs |

A new OCF interface type may be defined to interact with overlays: oic.if.overlay. Table 16 describes new OCF interface type oic.if.overlay.

TABLE 16

New Interface Type for overlay

| Interface | Name | Applicable Methods | Description |
|---|---|---|---|
| overlay | oic.if.overlay | CREATE, RETRIEVE, UPDATE, DELETE | If this interfaces is used on a resource type other than a resource of type: oic.wk.overlay, then it may be used to direct the OIC Server to use an overlay to handle the CREATE, RETRIEVE, UPDATE, or DELETE request. The specific overlay to use may be included as part of the content of the request. If this interface is used to access a resource of type oic.wk.overlay, then it may be used to read the properties of an overlay Resource. It may only applicable to a RETRIEVE request. The OIC server may return a JSON representation of the static overlay template. |

Figure 24:
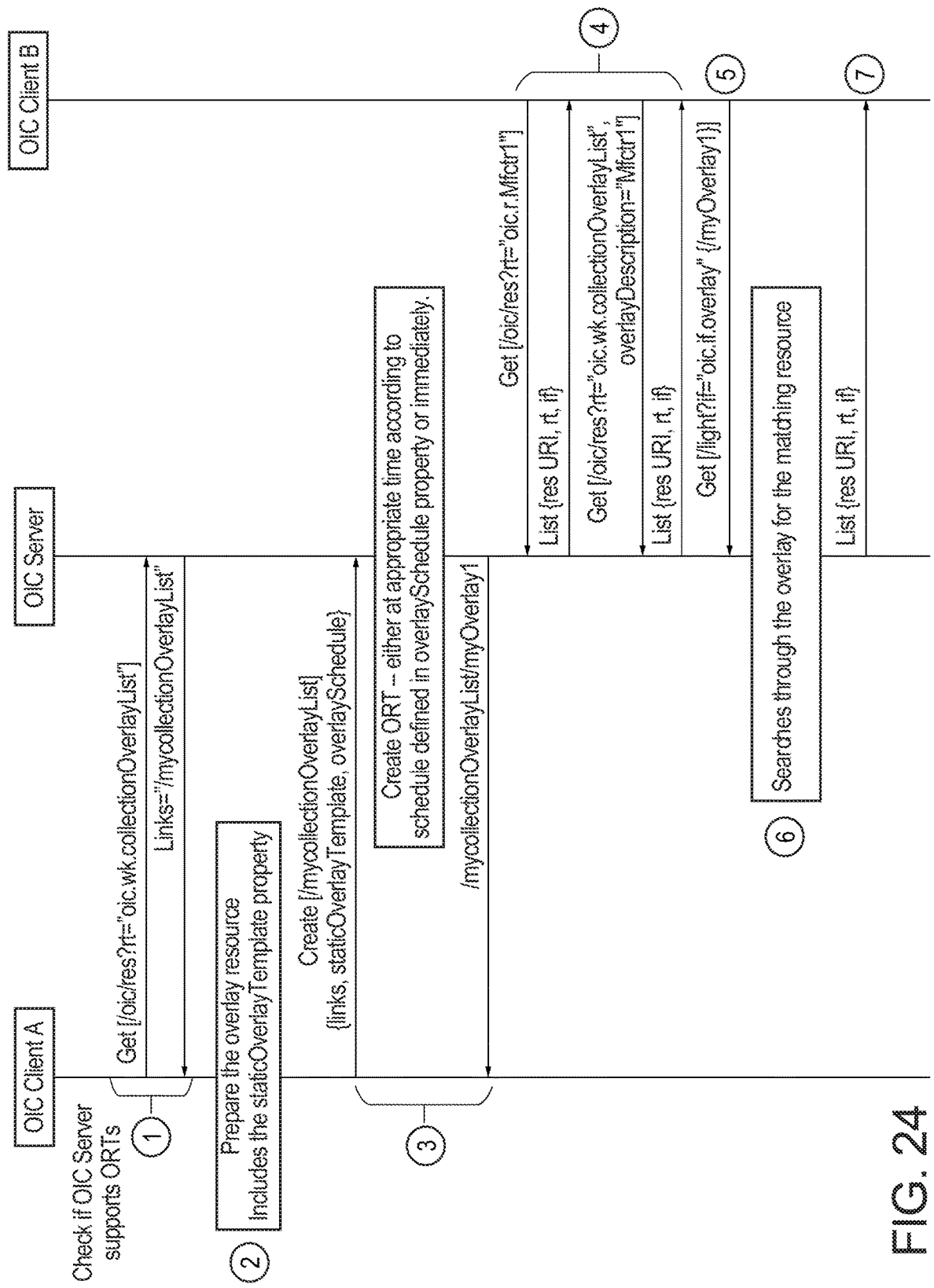
FIG. 24 illustrates an example sequence diagram for example procedural interactions related to ORTs.

FIG. 24 illustrates an example sequence diagram for procedural interactions related to ORTs.

An OIC client A would like to structure resources on an OIC server according to a certain overlay. A second OIC client B would then like to retrieve resources based on this newly created overlay. The following inferences may be drawn: OIC Client A may behave like an ORT Producer; OIC Client B may behave like an ORT Consumer; and the OIC Server may behave like an ORT Host.

The following general interactions are described in the FIGs. It is assumed that OIC Client A has already discovered the resources that are hosted on the OIC Server and has determined to create an overlay for these resources, myOverlay1.

At step 1, OIC Client A may determine if OIC Server supports ORTs by checking if/oic/res contains the rt of the overlayCollection resource. Such a check may be performed via a GET request.

At step 2, OIC Client A may determine how to structure the discovered resources. OIC Client A may prepare the myOverlay1 resource with the desired staticOverlayTemplate and overlay Schedule.

At step 3, OIC Client A may create the myOverlay1 resource on the OIC Server. The OIC Server may form the ORT based on the staticOverlayTemplate and at the desired time. As a result of the ORT formation, the OIC Server may update the common properties of the resources that are in the ORT. For example, the OIC Server may change the complex property overlayFamily of these resources.

At step 4, OIC Client B may discover the needed resources on the OIC Server and may also discover that the OIC server has an ORT to facilitate access to these resources.

At step 5, OIC Client B may issue a GET request to the OIC server to retrieve these resources and may also request to use the discovered ORT.

At step 6, the OIC Server may search through the ORT to retrieve the requested resources.

At step 7, the matching resources may be returned to OIC Client B.

Example Graphical User Interface

Figure 25:
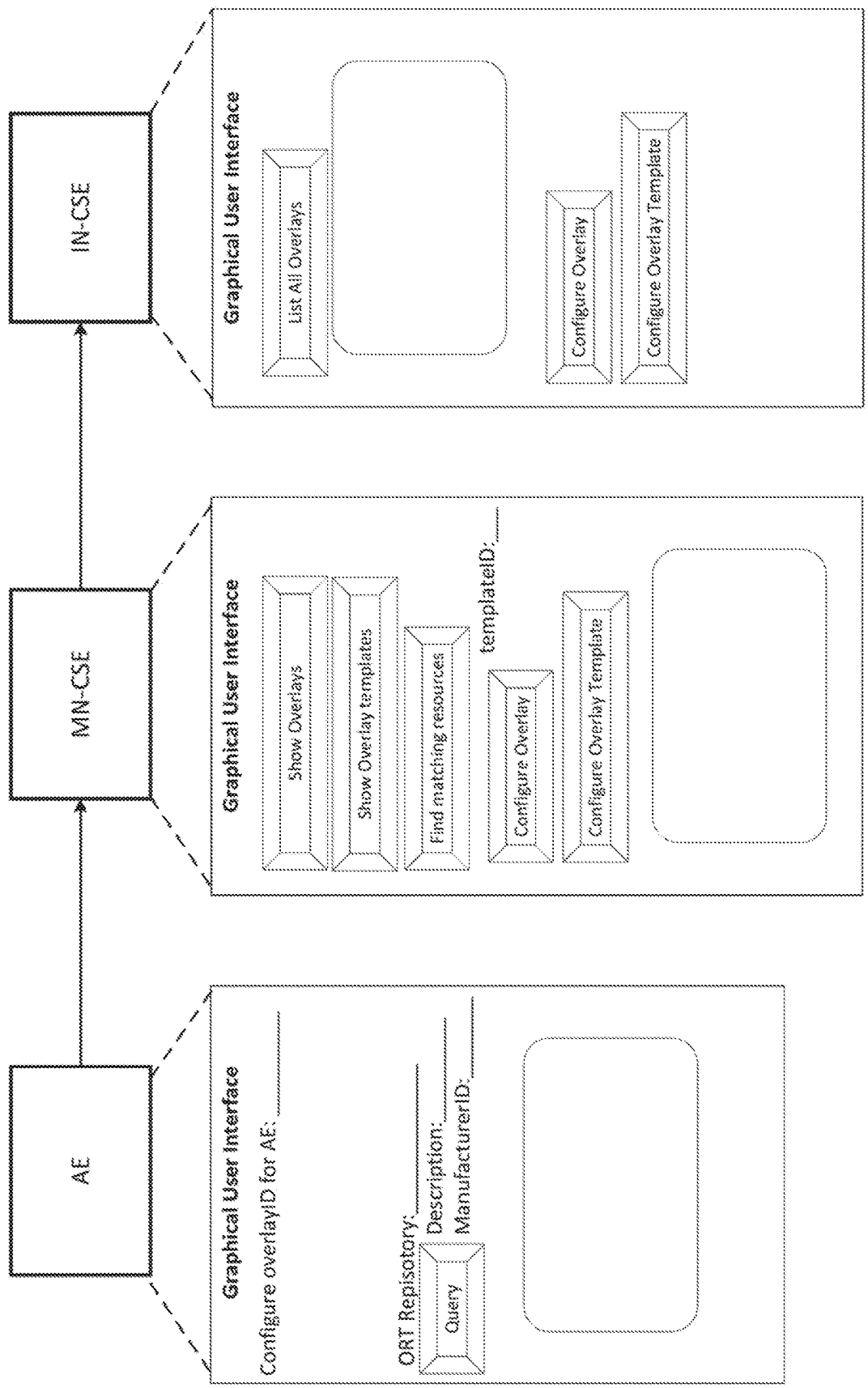
FIG. 25 shows an example graphical user interface (GUI) in accordance with an example embodiment.

To provide a convenient avenue for configuring or accessing any or all of the aforementioned parameters, an embodiment includes a user control panel. In particular, the interface may have a graphical user interface (GUI) that allows a user to input desired values for the parameters or access values of the parameters during entity setup and deployment. Such an example GUI can be seen in FIG. 25 for accessing the properties of various resources on an AE and CSEs. For example, depending on the specific context or application scenario, users may use such a GUI to view and configure the properties of available overlays. As can be seen in FIG. 25, input boxes and/or selection buttons may be used to enter or change attributes.

A user interface may be added to the AEs to query a CSE for available overlays and/or to configure an overlayID associated with the AE. A user interface can be added to the CSEs, such as an MN-CSE and an IN-CSE, to query another CSE for available overlays. Such a user interface may also be used to display the hosted overlay information, such as number active, number inactive, number of child resources per overlay, and overlay description. A user interface may also display the hosted dynamicOverlayTemplate information, such as mask, action, and associated overlay. A user interface may be utilized to configure a user-defined overlay and/or dynamicOverlayTemplate and may also be utilized to trigger the action of finding resources matching an overlay template.

Example Environment

Figure 26A:
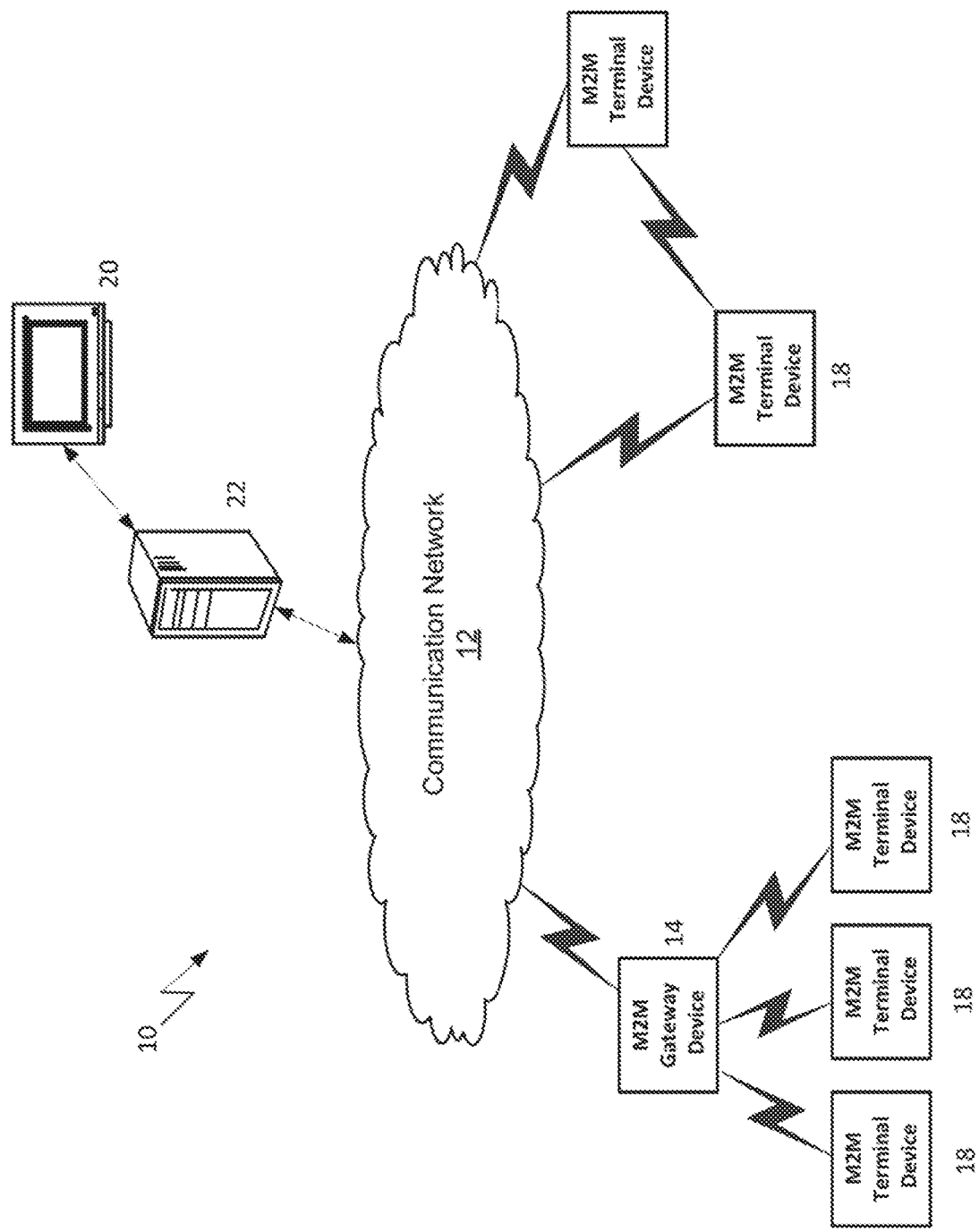
FIG. 26A is a system diagram of an example machine-to-machine (M2M), Internet of Things (IoT), or Web of Things (WoT) communication system in which one or more disclosed embodiments may be implemented.

FIG. 26A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIG. 1, 3, 5-8, 11-15, 20-21, 24, or 25 may comprise a node of a communication system, such as the ones illustrated in FIGS. 26A-D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 26A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 26A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 26B:
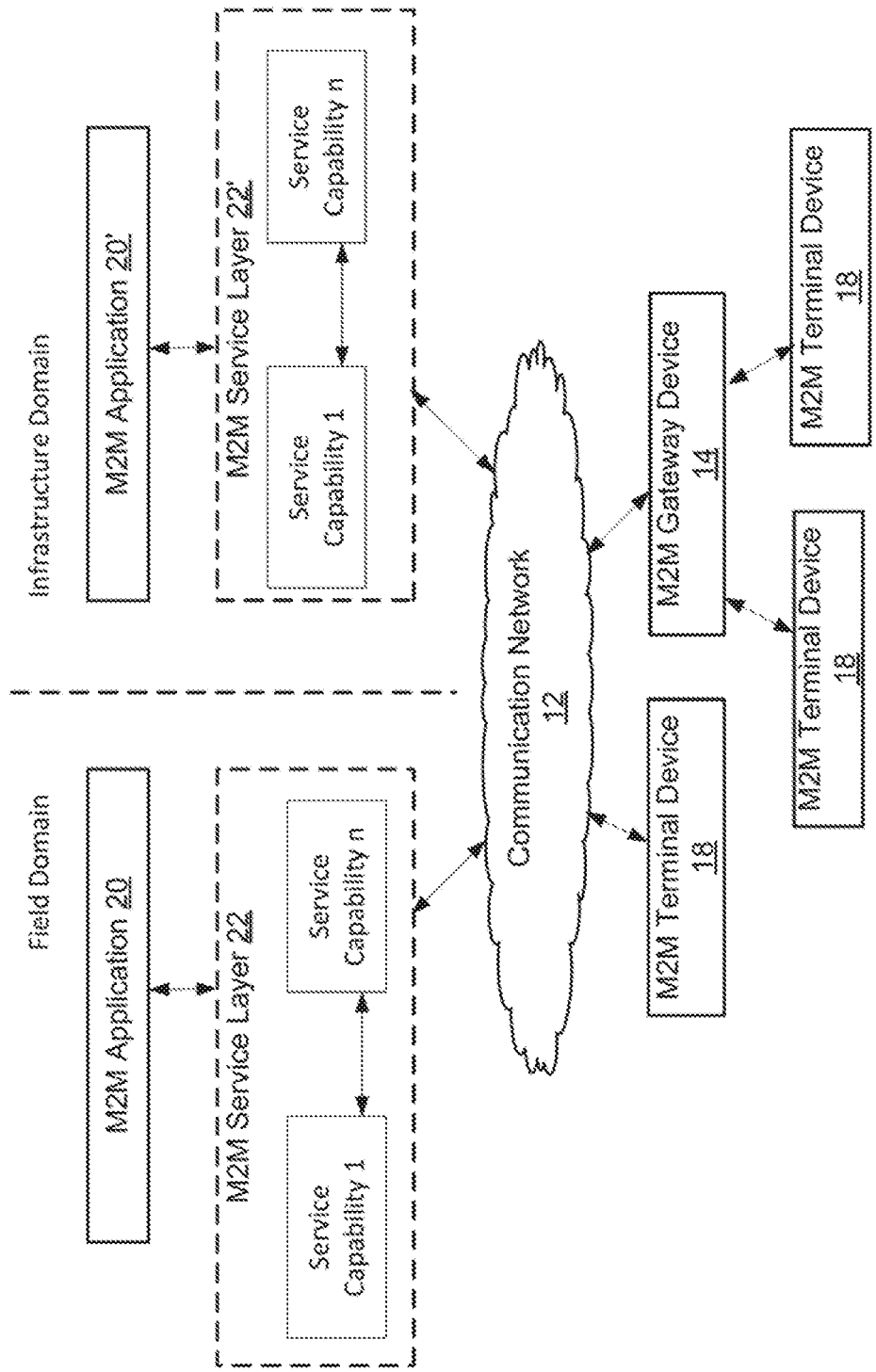
FIG. 26B is a system diagram of an example architecture that may be used within the M2M/IoT/WoT communications system illustrated in FIG. 26A.

Referring to FIG. 26B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 26B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 26B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 26C or FIG. 26D described below.

Further, the methods and functionalities described herein may be implemented as part of an M2M network that uses a Service Oriented Architecture (SOA) and/or a Resource-Oriented Architecture (ROA) to access services.

Figure 26C:
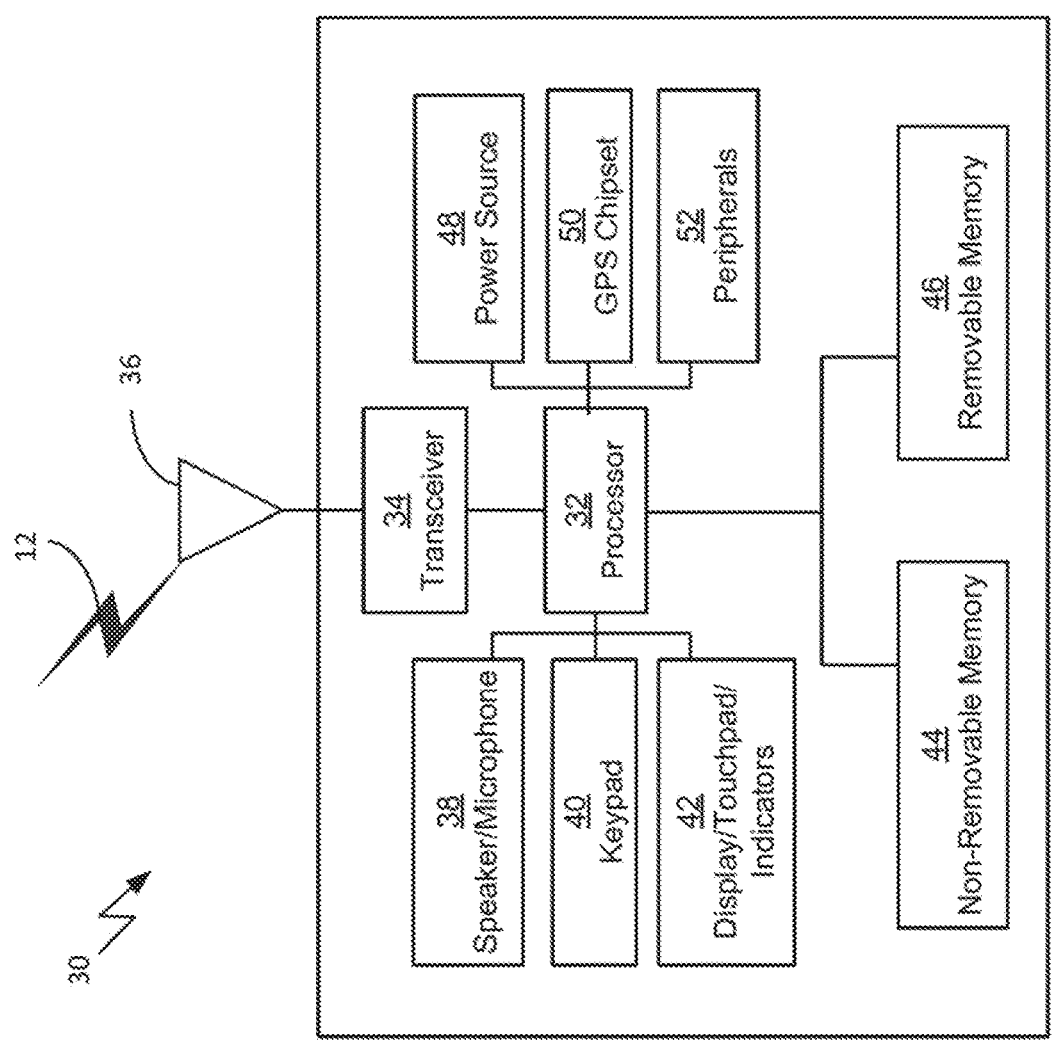
FIG. 26C is a system diagram of an example communication network apparatus, such as an M2M/IoT/WoT device, gateway, or server that may be used within the communications system illustrated in FIGS. 26A and 26B.

FIG. 26C is a block diagram of an example hardware/software architecture of a node of a network, such as one of the clients, servers, or proxies illustrated in FIG. 1, 3, 5-8, 11-15, 20-21, 24, or 25, which may operate as an M2M server, gateway, device, or other node in an M2M network such as that illustrated in FIGS. 26A and 26B. As shown in FIG. 26C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the overlay resource trees described herein, e.g., in relation to the methods described in reference to FIGS. 8, 11-15, 21, and 24, or the data structures of FIGS. 1-7, 9A-10C, 16-20, and 22-23, Tables 1-16, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 26C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 1, 3, 5-8, 11-15, 20-21, 24, and 25) and in the claims. While FIG. 26C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 26C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a node or configure a node, and in particular underlying networks, applications, or other services in communication with the node. In one embodiment, the display/indicators 42 may present the graphical user interface illustrated in FIG. 25 and described herein.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 26D:
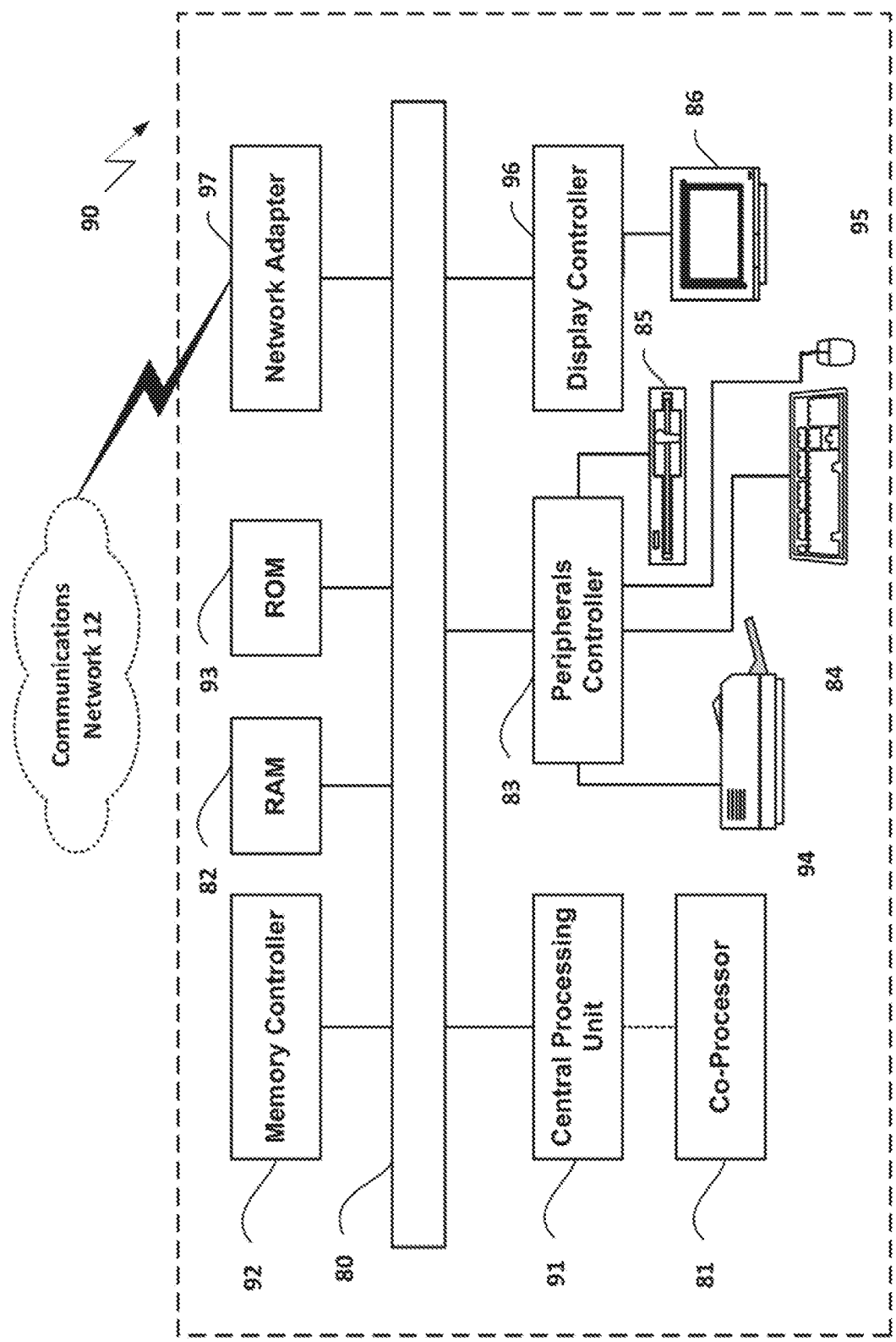
FIG. 26D is a block diagram of an example computing system in which a node or apparatus of the communication system of FIGS. 26A and 26B may be embodied.

FIG. 26D is a block diagram of an exemplary computing system 90 which may also be used to implement one or more nodes of a network, such as the clients, servers, or proxies illustrated in FIGS. 1, 3, 5-8, 11-15, 20-21, 24, and 25 and described herein, which may operate as an M2M server, gateway, device, or other node in an M2M network such as that illustrated in FIGS. 26A and 26B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 25 and its accompanying description.

Further, computing system 90 may contain communication circuitry, such as for example a network adaptor 97, that may be used to connect computing system 90 to an external communications network, such as network 12 of FIG. 26A-D, to enable the computing system 90 to communicate with other apparatuses of the network. The communication circuitry, alone or in combination with the CPU 91, may be used to perform the transmitting and receiving steps described herein (e.g., in FIG. 1, 3, 5-8, 11-15, 20-21, 24, or 25) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A first apparatus comprising a processor, a memory, and communication circuitry, the first apparatus being connected to a communications network via its communication circuitry, the first apparatus further comprising computer-executable instructions stored in the memory of the first apparatus which, when executed by the processor of the first apparatus, cause the first apparatus to:

receive, via the communications network from a second apparatus on the network, a request message to create an overlay resource, by the first apparatus and for a physical resource tree, the physical resource tree having a root and at least one branch point stemming from at least one of the root or at least one branch of the physical resource tree, the physical resource tree defining a first parent-child relationship between one or more physical resources in a tree structure, wherein the physical resources are hosted on a third apparatus, and wherein the overlay resource indicates an overlay resource tree establishing second parent-child relationships between one or more of the physical resources of the physical resource tree hosted on the third apparatus, wherein the second parent-child relationships are different than the first parent-child relationships, the overlay resource tree defined by a root resource and at least one branch stemming from one or more branching points to one or more child resources;

create the overlay resource by selecting a subset of the one or more physical resources of the physical resource tree and establishing the second parent-child relationships between the selected subset of the one or more physical resources, comprising the root resource and the one or more child resources of the overlay resource tree, send, via the communications network to the second apparatus on the network, a response message indicating the overlay resource was created.

2. The first apparatus recited in claim 1, wherein the computer-executable instructions, when executed by the processor of the first apparatus, further cause the first apparatus to:

receive, via the communication network from the second apparatus on the network, a request message indicating first branching point resources of the overlay resource tree to create, the first branching point resources representing, at least in part, the second parent-child relationship between the one or more of the physical resources from the physical resource tree;

create the first branching point resources of the overlay resource tree representing, at least in part, the second child-parent relationship between the one or more of the physical resources from the physical resource tree; and send, via the communication network to the second apparatus on the network, a response message indicating the first branching point resources of the overlay resource tree were created.

3. The first apparatus recited in claim 1, wherein the request message to create an overlay resource further comprises an attribute indicating a scheduled activation time, and wherein the computer-executable instructions, when executed by the processor of the first apparatus, further cause the first apparatus to:

wait to create the overlay resource until the scheduled activation time.

4. The first apparatus recited in claim 1, wherein the computer-executable instructions, when executed by the processor of the first apparatus, further cause the first apparatus to:

before creating the overlay resource, determine the eligibility of each physical resource indicated in the overlay resource to be included in the overlay resource tree.

5. The first apparatus recited in claim 4, wherein the eligibility is determined via an eligibility attribute of each physical resource.

6. The first apparatus recited in claim 4, wherein the eligibility is determined via a set of rules.

7. The first apparatus recited in claim 1, wherein the overlay resource comprises a static overlay template attribute, and wherein the computer-executable instructions, when executed by the processor of the first apparatus, further cause the first apparatus to:

update attributes of the one or more physical resources of the physical resource tree to indicate the second parent-child relationships between the physical resources.

8. The first apparatus recited in claim 1, wherein the overlay resource comprises a static overlay template attribute, and wherein the computer-executable instructions, when executed by the processor of the first apparatus, further cause the first apparatus to:

for each physical resource of the one or more physical resources of the physical resource tree indicated by the overlay resource:

create a stand-in overlay resource to match the overlay resource tree, wherein the stand-in overlay resource may act as a replacement for the physical resource and wherein the stand-in overlay resource may link to the physical resource.

9. The first apparatus recited in claim 1, wherein the overlay resource comprises a static overlay template attribute, and wherein the computer-executable instructions, when executed by the processor of the first apparatus, further cause the first apparatus to:

for each physical resource of the one or more physical resources of the physical resource tree indicated by the overlay resource:

create a copy overlay resource to match the overlay resource tree, wherein the copy overlay resource may be a copy of the physical resource.

10. The first apparatus recited in claim 9, wherein the request message to create an overlay resource further comprises an attribute indicating an update rate, and wherein the computer-executable instructions, when executed by the processor of the first apparatus, further cause the first apparatus to:

sync each created copy overlay resource with the respective physical resource of each created copy overlay resource.

11. The first apparatus recited in claim 1, wherein the computer-executable instructions, when executed by the processor of the first apparatus, further cause the first apparatus to:

receive, via the communication network from the second apparatus on the network, a request message indicating a dynamic overlay template resource to create;

create the dynamic overlay template resource; and send, via the communication network to the second apparatus on the network, a response message indicating the dynamic overlay template resource was created.

12. The first apparatus recited in claim 11, wherein the dynamic overlay template resource comprises a mask attribute and an action attribute, and wherein the computer-executable instructions, when executed by the processor of the first apparatus, further cause the first apparatus to:

determine a physical resource of the one or more physical resources matches a value of the mask attribute; and update, based on the action attribute, one or more attributes of the physical resource to indicate inclusion in the overlay resource tree.

13. The first apparatus recited in claim 1, wherein the computer-executable instructions, when executed by the processor of the first apparatus, further cause the first apparatus to:

receive, via the communication network from a fourth apparatus on the network, a request message to retrieve the overlay resource indicating the overlay resource tree;

send, via the communication network to the fourth apparatus on the network, the overlay resource indicating the overlay resource tree;

receive, via the communication network from the fourth apparatus on the network, a request message to create a new physical resource, wherein the new physical resource adheres to the hierarchy of the overlay resource tree.

14. A first apparatus comprising a processor, a memory, and communication circuitry, the first apparatus being connected to a communications network via its communication circuitry, the first apparatus further comprising computer-executable instructions stored in the memory of the first apparatus which, when executed by the processor of the first apparatus, cause the first apparatus to:
  generate an overlay resource for a physical resource tree, the physical resource tree having a root and at least one branch point stemming from at least one of the root or at least one branch of the physical resource tree, the physical resource tree defining a first parent-child relationship between one or more physical resources in a tree structure, wherein the one or more physical resources are hosted on a second apparatus, wherein the overlay resource indicates an overlay resource tree establishing second parent-child relationships between one or more subsets of the one or more physical resources of the physical resource tree,
  wherein the second parent-child relationships are different than the first parent-child relationships, the overlay resource tree defined by a root resource and at least one branch stemming from one or more branching points to one or more child resources;
  send, via the communication network to a third apparatus on the network, a request message to create an overlay resource tree; and
  receive, via the communication network from the third apparatus on the network, a response message indicating the overlay resource was created, the overlay resource being created by selecting a subset of the one or more physical resources of the physical resource tree and establishing the second parent-child relationship between the selected subset of the one or more physical resources, comprising a root resource and the one or more child resources of the overlay tree.

15. The first apparatus recited in claim 14, wherein the computer-executable instructions, when executed by the processor of the first apparatus, further cause the first apparatus to:
  send, via the communication network to the third apparatus on the network, a request message indicating overlay criteria; and
  receive, via the communication network from the third apparatus on the network, a response message indicating one or more overlay resource trees matching the overlay criteria.

16. The first apparatus recited in claim 15, wherein the overlay criteria comprise at least one of: a resource type, a manufacturer, a size, a parent resource, a location, and a resource creator.

17. The first apparatus recited in claim 14, wherein the computer-executable instructions, when executed by the processor of the first apparatus, further cause the first apparatus to:
  determine first branching points of the overlay resource tree that are not in the physical resource tree;
  send, via the communication network to the third apparatus on the network, a request message indicating the first branching points to create; and
  receive, via the communication network from the third apparatus on the network, a response message indicating the first branching points were created.

18. The first apparatus recited in claim 14, wherein the computer-executable instructions, when executed by the processor of the first apparatus, further cause the first apparatus to:
  determine to create a dynamic template resource associated with the overlay resource;
  send, via the communication network to the third apparatus on the network, a request message indicating the dynamic template resource to create; and
  receive, via the communication network from the third apparatus on the network, a response message indicating the dynamic template resource was created.

19. The first apparatus recited in claim 18, wherein the created dynamic template resource comprises a mask attribute and an action attribute.

20. The first apparatus recited in claim 14, wherein the overlay resource tree indicates hierarchical relationships via one or more overlay attributes added to the physical resources.

* * * * *